(12) United States Patent
Koezuka et al.

(10) Patent No.: US 8,115,594 B2
(45) Date of Patent: *Feb. 14, 2012

(54) TAG COMMUNICATION DEVICE, TAG MOVING DIRECTION DETECTING SYSTEM AND TAG MOVING DIRECTION DETECTING METHOD

(75) Inventors: Yahiro Koezuka, Kyoto-fu (JP); Kisho Iida, Kyoto-fu (JP)

(73) Assignee: Omron Corporation, Kyoto (JP)

( * ) Notice: Subject to any disclaimer, the term of this patent is extended or adjusted under 35 U.S.C. 154(b) by 1312 days.

This patent is subject to a terminal disclaimer.

(21) Appl. No.: 11/797,871

(22) Filed: May 8, 2007

(65) Prior Publication Data
US 2007/0273530 A1 Nov. 29, 2007

(30) Foreign Application Priority Data
May 10, 2006 (JP) ................... 2006-131894

(51) Int. Cl.
*H04Q 5/22* (2006.01)
(52) U.S. Cl. .............. 340/10.1; 340/572.1; 340/572.7
(58) Field of Classification Search .......... 340/10.1, 340/572.1, 572.4, 572.7; 342/115, 158, 44
See application file for complete search history.

(56) References Cited

U.S. PATENT DOCUMENTS

| | | | | |
|---|---|---|---|---|
| 5,227,803 A | * | 7/1993 | O'Connor et al. | 342/442 |
| 7,605,684 B2 | * | 10/2009 | Hansen | 340/10.3 |
| 2004/0196184 A1 | * | 10/2004 | Hollander et al. | 342/418 |
| 2006/0077039 A1 | * | 4/2006 | Ibi et al. | 340/10.1 |
| 2007/0030150 A1 | * | 2/2007 | Mullins | 340/572.1 |
| 2008/0224828 A1 | * | 9/2008 | Ando et al. | 340/10.4 |
| 2010/0237995 A1 | * | 9/2010 | Iwahashi | 340/10.1 |

FOREIGN PATENT DOCUMENTS

| | | |
|---|---|---|
| JP | 06-258425 | 9/1994 |
| JP | 09-172505 | 6/1997 |

* cited by examiner

*Primary Examiner* — Edwin Holloway, III
(74) *Attorney, Agent, or Firm* — Dickstein Shapiro LLP

(57) ABSTRACT

The invention provides a tag communication device, a tag moving direction detecting system and a tag moving direction detecting method able to detect the moving direction of a moving body attaching a RFID tag thereto by simple processing, and able to easily detect the moving direction even when its moving speed is increased. A scan antenna scans a beam of a transmitted radio wave toward a belt conveyer for conveying baggage with a RFID tag. ID is read from the RFID tag, and reading NO. and a scan angle are related and recorded to a measuring data table, and plot data are generated. These plot data are plotted in an XY coordinate system, and a plot graph is generated. Further, a linear approximate straight line is calculated from this plot graph, and a moving direction of the baggage is detected from an inclination value of the linear approximate straight line.

15 Claims, 20 Drawing Sheets

$I_k = d_k \cdot \sin\theta$

BROAD SIDE DIRECTION

| TABLE NO. | SCAN ANGLE |
|---|---|
| 0 | α |
| 1 | β |

| READING NO. | READING TIME | RFID TAG NO. (ID) | TABLE NO. |
|---|---|---|---|
| 1 | t1 | 0X00011D8C | 0 |
| 2 | t2 | 0X00044D29 | 0 |
| 3 | t3 | 0X00055D08 | 0 |
| 4 | t4 | 0X00022DEF | 0 |
| 5 | t5 | 0X00044D29 | 0 |
| 6 | t6 | 0X00055D08 | 0 |
| 7 | t7 | 0X00033DCE | 0 |
| 8 | t8 | 0X00011D8C | 0 |
| 9 | t9 | 0X00022DEF | 0 |
| 10 | t10 | 0X00055D08 | 1 |
| 11 | t11 | 0X00011D8C | 0 |
| 12 | t12 | 0X00033DCE | 1 |
| 13 | t13 | 0X00022DEF | 1 |
| 14 | t14 | 0X00044D29 | 1 |
| 15 | t15 | 0X00055D08 | 1 |
| 16 | t16 | 0X00011D8C | 1 |
| 17 | t17 | 0X00011D8C | 0 |
| 18 | t18 | 0X00022DEF | 1 |
| 19 | t19 | 0X00011D8C | 1 |
| 20 | t20 | 0X00033DCE | 1 |

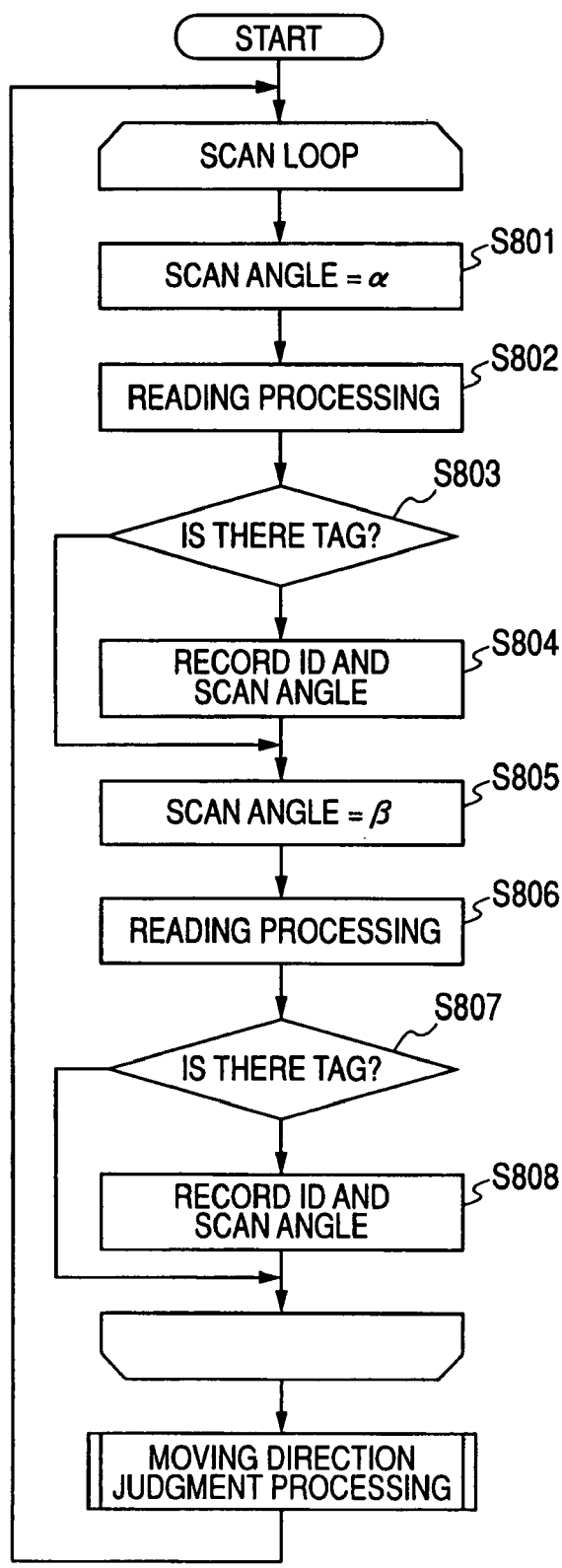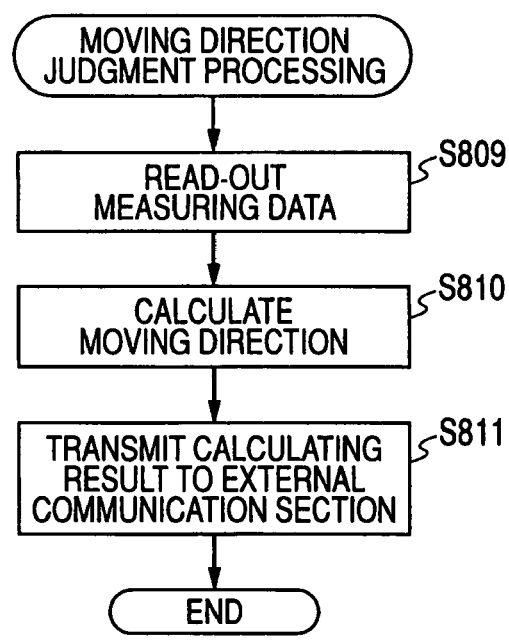
FIG. 8A
FIG. 8B

FIG. 9A

| x (READING NO.) | y (TABLE NO.) | x*y | x*x |
|---|---|---|---|
| 1 | 0 | 0 | 1 |
| 2 | 0 | 0 | 4 |
| 3 | 0 | 0 | 9 |
| 4 | 0 | 0 | 16 |
| 5 | 0 | 0 | 25 |
| 6 | 0 | 0 | 36 |
| 7 | 0 | 0 | 49 |
| 8 | 0 | 0 | 64 |
| 9 | 0 | 0 | 81 |
| 10 | 1 | 10 | 100 |
| 11 | 0 | 0 | 121 |
| 12 | 1 | 12 | 144 |
| 13 | 1 | 13 | 169 |
| 14 | 1 | 14 | 196 |
| 15 | 1 | 15 | 225 |
| 16 | 1 | 16 | 256 |
| 17 | 0 | 0 | 289 |
| 18 | 1 | 18 | 324 |
| 19 | 1 | 19 | 361 |
| 20 | 1 | 20 | 400 |

FIG. 9B

| $\Sigma x$ | $\Sigma y$ | $\Sigma x*y$ | $20*\Sigma x*y$ | $\Sigma x*x$ | $20*\Sigma x*x$ | INCLINATION VALUE S |
|---|---|---|---|---|---|---|
| 210 | 9 | 137 | 2740 | 2870 | 57400 | 0.0639 |

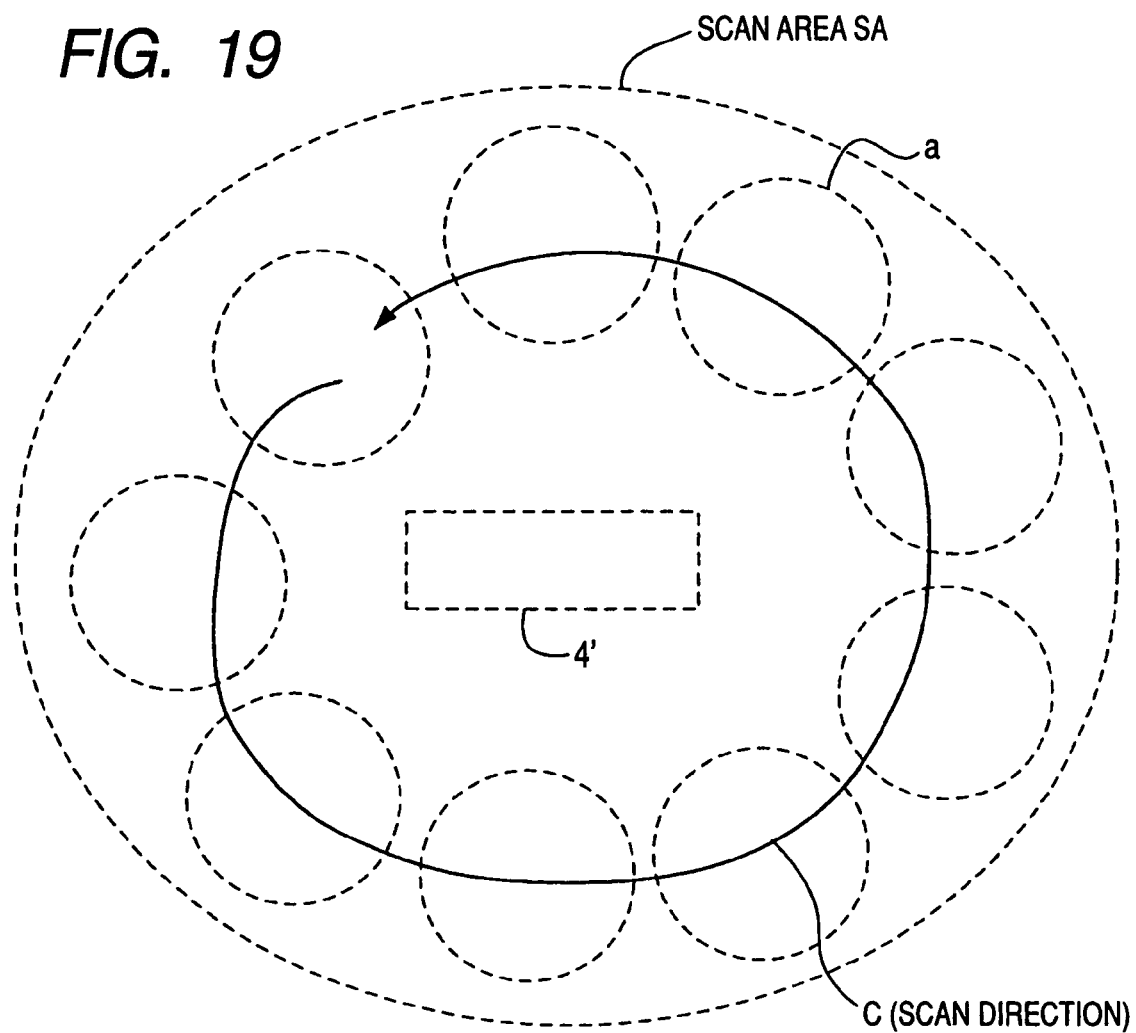

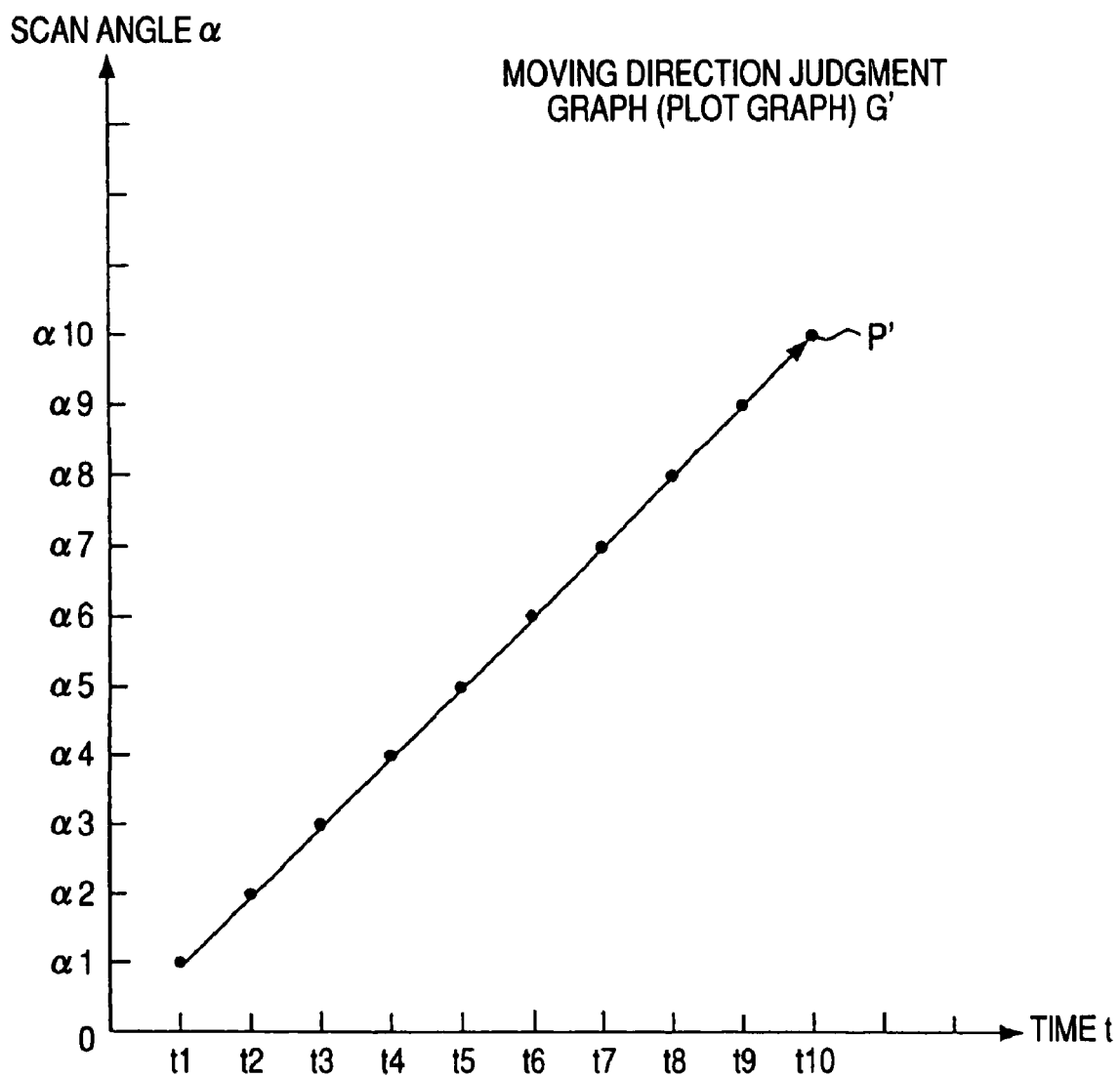

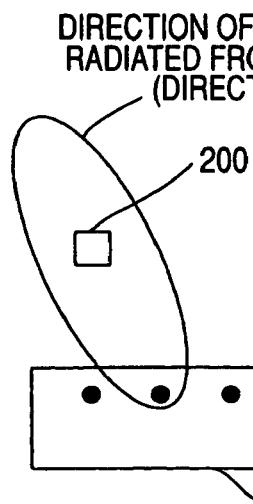
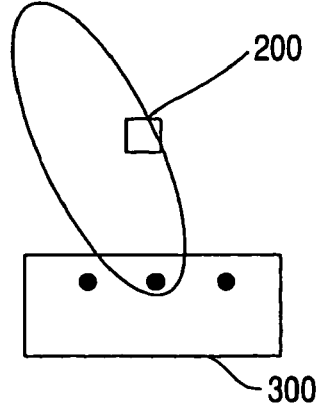
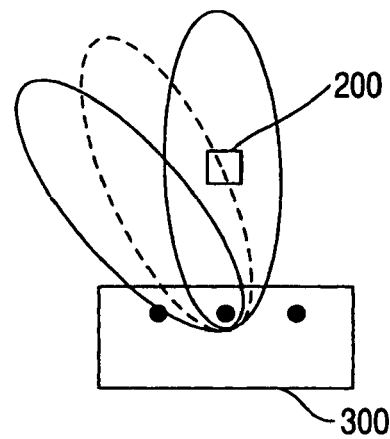
FIG. 23A — TAG IS MOVED
FIG. 23B — WHEN SIGNAL BECOMES WEAK
FIG. 23C — BEAM IS SWUNG ON BOTH SIDES AND MOVING DIRECTION IS DETECTED

TAG COMMUNICATION DEVICE, TAG MOVING DIRECTION DETECTING SYSTEM AND TAG MOVING DIRECTION DETECTING METHOD

BACKGROUND OF THE INVENTION

1. Field of the Invention

The present invention relates to a tag communication device, a tag moving direction detecting system and a tag moving direction detecting method able to detect a moving direction of a moving body attaching a RFID tag thereto.

2. Background Art

A technique for sticking a RFID Radio Frequency Identification) tag to baggage and managing the baggage by performing wireless communication of this RFID tag and a reader-writer is recently used. In accordance with this technique, for example, data of ID (Identification), etc. can be automatically read from the RFID tag attached to the baggage conveyed by a belt conveyer, etc. Accordingly, a commodity distribution operation is efficiently intentionally performed. However, no detection can be performed for a conveying direction of this baggage. Therefore, a problem exists in that it is impossible to automatically detect whether it is warehousing or forwarding.

For example, there is a technique disclosed in JP-A-2005-345198 as a publicly known technique for solving such a problem. In the technique of this JP-A-2005-345198, for example, when a RFID tag 200 located in a position of FIG. 23A is moved until a position of FIG. 23B and a response signal from the RFID tag 200 becomes weak in a reader-writer 300, directivity of an antenna of the reader-writer 300 is controlled as shown in FIG. 23C. Namely, the beam of a radio wave radiated from the antenna of the reader-writer 300 is swung on both sides. A communication result with the RFID tag 200 at a swinging time of the beam of the radio wave onto one side, and a communication result with the RFID tag 200 at a swinging time of the beam of the radio wave on the other side are compared, and the moving direction of the RFID tag 200 is detected. Further, when there are plural RFID tags 200, the moving direction of each RFID tag 200 is detected by swinging the beam to each RFID tag 200 in time division.

However, in accordance with the technique of this JP-A-2005-345198, if the number of RFID tags 200 is increased, its processing becomes complicated and it becomes difficult to pursue the movement of each RFID tag 200. Further, when the RFID tag 200 is moved at high speed, it becomes difficult to again detect the position of the original RFID tag 200 while another RFID tag 200 is pursued. Otherwise, a problem exists in that it takes much time until detection even when this position is detected.

SUMMARY OF THE INVENTION

The present invention is made to solve the above problem points, and its object is to provide a tag communication device, a tag moving direction detecting system and a tag moving direction detecting method able to detect the moving direction of the moving body attaching the RFID tag thereto by simple processing, and able to easily detect the moving direction even when its moving speed is increased.

To achieve the above object, the present invention resides in a tag communication device for performing wireless communication with a RFID tag attached to a moving body through a radio wave, and comprising:

a scan antenna having plural antenna elements and scanning a beam of the transmitted radio wave toward a space on a moving path of the moving body;

data generating means for relating signal receiving information from the RFID tag to time passage information, and generating plural sets of a scan angle of the scan antenna and the time passage information in receiving this signal receiving information; and moving direction detecting means for calculating a linear approximate straight line showing the relation between the scan angle and the time passage information by using data generated by the data generating means, and detecting a moving direction of the moving body attaching the RFID tag from an inclination of this linear approximate straight line.

To achieve the above object, the present invention also resides in a tag communication device for performing wireless communication with a RFID tag attached to a moving body through a radio wave, and comprising:

a scan antenna having plural antenna elements and scanning a beam of the transmitted radio wave toward a space on a moving path of the moving body;

data generating means for relating signal receiving information from the RFID tag to time passage information, and generating plural sets of a scan angle of the scan antenna and the time passage information in receiving this signal receiving information; and moving direction detecting means for detecting a moving direction of the moving body attaching the RFID tag by calculating a moving locus of the moving body using data generated by the data generating means.

Further, the present invention resides in a tag moving direction detecting system comprising the tag communication device and at least one RFID tag for performing wireless communication.

Further, the present invention resides in a tag moving direction detecting method comprising the steps of:

scanning the beam of a radio wave transmitted from a scan antenna of a tag communication device for performing wireless communication with a RFID tag attached to a moving body through the radio wave, toward a space on a moving path of the moving body;

relating signal receiving information from the RFID tag to time passage information, and generating plural sets of a scan angle of the scan antenna and the time passage information in receiving this signal receiving information; and calculating a linear approximate straight line showing the relation between the scan angle and the time passage information by using the generated data, and detecting a moving direction of the moving body attaching the RFID tag from an inclination of this linear approximate straight line.

Further, the present invention resides in a tag moving direction detecting method comprising the steps of:

scanning the beam of a radio wave transmitted from a scan antenna of a tag communication device for performing wireless communication with a RFID tag attached to a moving body through the radio wave, toward a space on a moving path of the moving body;

relating signal receiving information from the RFID tag to time passage information, and generating plural sets of a scan angle of the scan antenna and the time passage information in receiving this signal receiving information; and detecting a moving direction of the moving body attaching the RFID tag by calculating a moving locus of the moving body using the generated data.

The above "moving body" is an object moved by borrowing another force, for example, baggage, an article conveyed by a conveying means such as a belt conveyer. In this case, the belt conveyer becomes a moving path. Further, an object moved by its own force, e.g., a human being, an animal, etc. are also included in this "moving body".

Further, for example, the above "RFID tag" includes a RFID tag of a passive type in which an electric power source such as a battery is not arranged and a circuit is operated by electric power transmitted by the radio wave from the reader-writer, and wireless communication with the reader-writer is performed. The above "RFID tag" also includes a RFID tag of an active type having an electric power source such as a battery.

For example, the above "tag communication device" is a reader-writer or a reader and a writer able to communicate with the RFID tag.

For example, the above "scan antenna" is constructed by a phased array antenna able to scan the beam of the radio wave transmitted by electronic control at high speed. The above "scan antenna" is constructed from plural antenna elements, plural phase shifters respectively connected to these plural antenna elements, and one distributing synthesizing device connected to all these plural phase shifters. The radio wave inputted to the distributing synthesizing device is distributed to the phase shifter every each antenna element, and a predetermined desirable phase change is made in each phase shifter. Thereafter, the radio wave is radiated from each antenna element. In this case, the radio wave is strongly radiated in a direction for setting all the respective radio waves after the phase to the same phase, i.e., a direction for conforming the phase of a sine wave. This strongest radio wave is "a beam of the transmitted radio wave" in the present invention, e.g., a main lobe. This direction can be arbitrarily changed by setting the phase shifter.

The above plural antenna elements may be also constructed by a patch antenna, and are further two-dimensionally arrayed. The above scan antenna may be also set so as to perform two-dimensional scan with respect to the moving path of the above moving body. If the plural antennas are constructed from the patch antenna, the scan antenna can be thinly manufactured, and manufacture cost can be lowly restrained so that it is suitable. Further, if the plural antennas are two-dimensionally arrayed, e.g., if the plural antenna elements are arrayed in a circular shape, a matrix shape, etc. on the same plane, the scan can be performed so as to draw a circle. Accordingly, the moving direction of the moving body can be two-dimensionally detected. Namely, when the moving body is moved on the XY plane, a movement to the X-direction and a movement to the Y-direction can be simultaneously detected.

Further, for example, when the baggage with the RFID tag is conveyed by the belt conveyer, the above "space on the moving path of the moving body" is a space on this belt conveyer. If it is physically seen, the RFID tag is moved in parallel with the belt conveyer in the space on the belt conveyer. Accordingly, if the scan is performed toward this space, the reader-writer can wirelessly communicate with the RFID tag. In this case, the RFID tag is moved by drawing a locus on the belt conveyer. Accordingly, if one portion of this locus can be scanned by the scan antenna, an arranging place of the scan antenna can be arbitrarily set.

The above "signal receiving information from the RFID tag" is ID (Identification), etc. constructed by tag NO. for discriminating the RFID tag. This ID is utilized in detecting "what" has been moved. Further, in the present invention, this signal receiving information is related to time passage information. This time passage information is time information for specifying a time point at which the RFID tag and the tag communication device perform the wireless communication. For example, the time passage information is a reading order of the RFID tag, etc.

Further, when the beam of a radio wave transmitted by the scan antenna is scanned, the above "scan angle" is an angle showing a radiating direction of this beam. For example, when the phased array antenna having plural antenna elements linearly arrayed is used in the scan antenna, the above "scan angle" is an inclination angle of the beam measured with a broad side direction as a reference.

If a thing and a person are moved, a temporal change of a position is caused. Accordingly, if there are at least time information and position information, the movement can be detected. Therefore, in the present invention, plural data constructed by a set of "time passage information" as time information and the "scan angle" as position information are constructed so as to be generated.

Further, in the present invention, the moving direction of the moving body is detected by utilizing the following technique using these generated data.

Namely, one technique is a technique for calculating a linear approximate straight line showing the relation between the above scan angle and the above time passage information, and detecting the moving direction by calculating its inclination. This technique is particularly suitable for detection of a one-dimensional movement of the moving body. Another technique is a technique for detecting the moving direction by calculating a moving locus of the above moving body. This technique is particularly suitable for detection of a two-dimensional movement of the moving body.

As explained above, in accordance with the present invention, the beam of the radio wave transmitted by the scan antenna toward the space on the moving path of the moving body with the RFID tag is scanned. Plural sets of the scan angle and the time passage information are generated, and the moving direction is detected by using generated data. Thus, the moving direction of the moving body sticking the RFID tag thereto can be simply detected without requiring complicated scan control of the scan antenna as in the technique disclosed in JP-A-2005-345198. Further, when the moving body is conveyed at high speed, the reading number of the RFID tag can be increased by merely adjusting the speed of scan in accordance with its conveying speed. As a result, an operation effect in which accuracy of detection of the moving direction can be easily improved, etc. are obtained.

BRIEF DESCRIPTION OF THE DRAWINGS

FIG. 6 is a view showing a scan pattern table.

FIG. 7 is a view showing a measuring data table.

FIG. 8A is a flow chart showing scan processing in the scan antenna, and FIG. 8B is a flow chart showing moving direction judgment processing.

FIGS. 9A and 9B are views showing a moving direction calculating table.

FIG. 19 is a typical view showing a situation of scan in another embodiment mode.

FIG. 20 is a view showing a measuring data table in another embodiment mode.

FIG. 21 is a view showing a moving direction judging graph in another embodiment mode.

FIGS. 23A to 23C are explanatory views of a publicly known technique disclosed in JP-A-2005-345198.

DESCRIPTION OF THE PREFERRED EMBODIMENTS

A best mode for embodying the present invention will next be explained in detail with reference to the accompanying drawings.

Figure 1A:
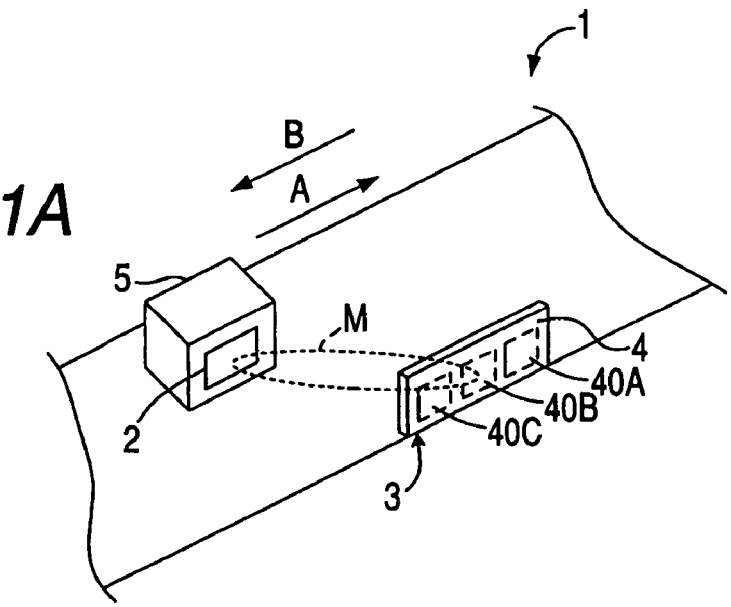
FIGS. 1A to 1C are explanatory views showing the summary of a RFID communication system applying the present invention thereto.
Figure 1B:
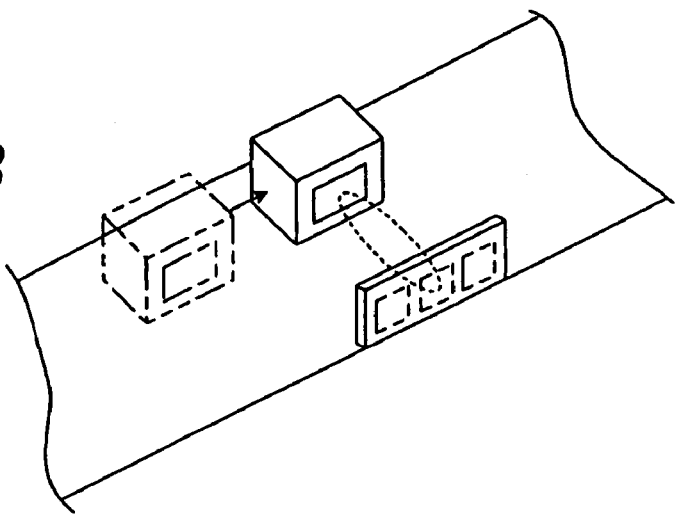
Figure 1C:
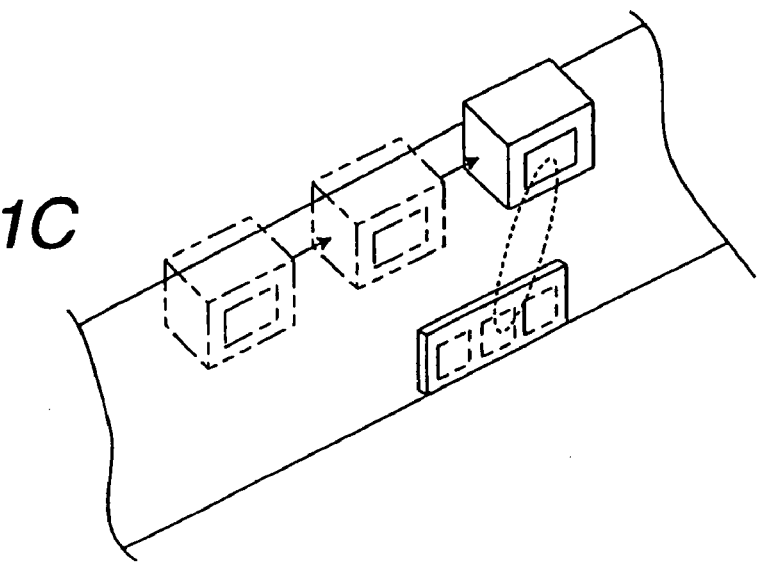

FIGS. 1A to 1C are explanatory views showing the summary of a first embodiment mode of a RFID communication system applying the present invention thereto. The RFID communication system 1 of this figure manages warehousing and forwarding of many pieces of baggage 5 (moving body) conveyed by a belt conveyer 6. With respect to the RFID tag 2 respectively attached to the baggage 5, a reader-writer 3 reads and writes data by performing wireless communication.

The summary of this embodiment mode will be explained. In FIGS. 1A to 1C, the reader-writer 3 has a scan antenna 4 although simplified and described. The scan antenna 4 has three antenna elements 40A, 40B, 40C arrayed in a straight line shape along the belt conveyer 6, and repeatedly scans the direction of a beam M of a radio wave transmitted to the exterior as shown in FIGS. 1A to 1C. On the other hand, the RFID tag 2 is stuck to the baggage 5, and this baggage 5 is conveyed in the direction of an arrow A within FIG. 1A by the belt conveyer 6. In this conveyance, the RFID tag 2 and the reader-writer 3 performs wireless communication, and the moving direction of the baggage 5, i.e., the direction of an arrow A within FIG. 1A or the direction of an arrow B is detected on the basis of this communication result.

The explanation will next be made in detail.

Figure 2:
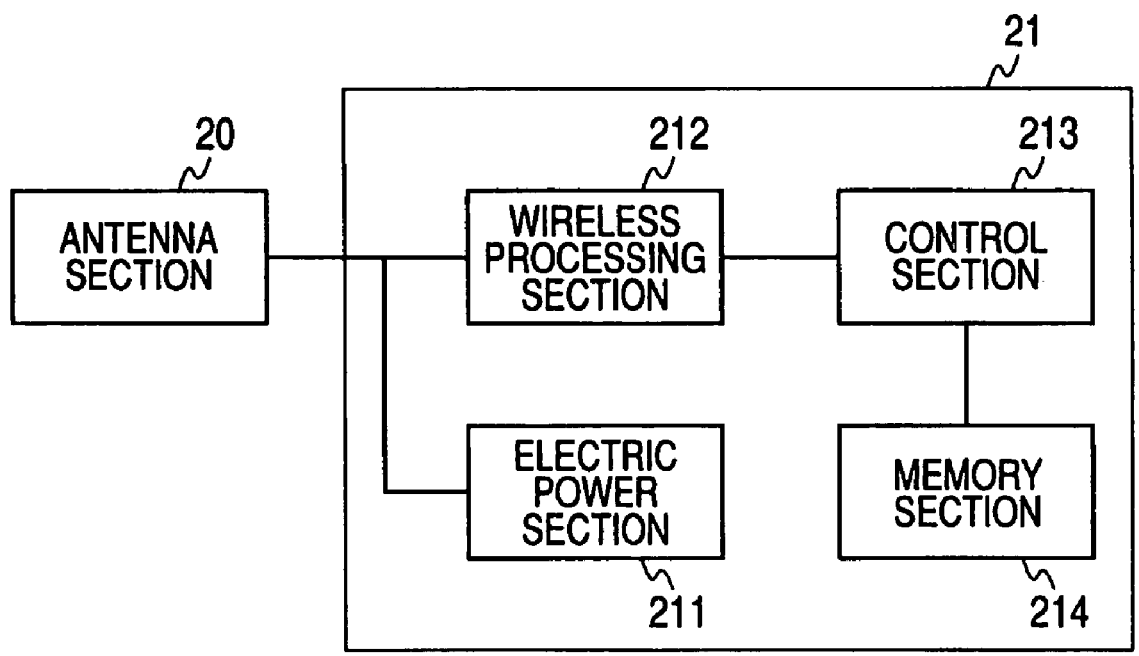
FIG. 2 is a block diagram showing the schematic construction of a RFID tag.

FIG. 2 is a block diagram showing the schematic construction of the RFID tag 2. As shown in this figure, the RFID tag 2 is constructed by arranging an antenna section 20 and a wireless communication IC 21. For example, the above passive type and an active type are used as the RFID tag 2 of this kind.

The antenna section 20 receives the radio wave from the reader-writer 3 as an electric power source for operating the wireless communication IC 21. Further, the antenna section 20 converts the radio wave received from the reader-writer 3 into a wireless signal, and transmits the wireless signal to the wireless communication IC 21. Further, the antenna section 20 converts the wireless signal from the wireless communication IC 21 into a radio wave, and transmits this radio wave to the reader-writer 3. An antenna, a resonant circuit, etc. are used in the antenna section 20.

The wireless communication IC 21 stores data from the reader-writer 3 and transmits the stored data to the reader-writer 3 through the antenna section 20 on the basis of a signal received from the reader-writer 3 through the antenna section 20. As shown in FIG. 2, this wireless communication IC 21 is constructed by arranging an electric power section 211, a wireless processing section 212, a control section 213 and a memory section 214.

The electric power section 211 rectifies an induction voltage generated by receiving a radio wave by the antenna section 20 by a rectifying circuit. After the induction voltage is adjusted to a predetermined voltage by an electric power circuit, the electric power section 211 supplies this voltage to each section of the wireless communication IC 21. Abridge diode, a capacitor for a voltage adjustment, etc. are used in the electric power section 211.

The wireless processing section 212 converts a wireless signal received from the exterior through the antenna section 20 into an original form, and transmits converted data to the control section 213. Further, the wireless processing section 212 converts data received from the control section 213 into a form suitable for wireless transmission, and transmits the converted wireless signal to the exterior through the antenna section 20. An A/D (Analog to Digital) converting circuit, a D/A (Digital to Analog) converting circuit, a modulating-demodulating circuit, an RF circuit, etc. are used in the wireless processing section 212.

The control section 213 generally controls the operations of the above various kinds of constructions within the wireless communication IC 21. The control section 213 has a logic arithmetic circuit, a register, etc., and functions as a computer. The operations of the various kinds of constructions are controlled by executing a control program by a computer. For example, this program may be also a mode in which a program installed to ROM (Read Only Memory), etc. of the memory section 214 is read and used. This program may be also a mode in which the above program is downloaded from the reader-writer 3 through the antenna section 20 and the wireless processing section 212, and is installed to the memory section 214 and is executed.

In particular, the control section 213 stores data from the reader-writer 3 to the memory section 214 and reads out the data stored to the memory section 214 on the basis of data received from the reader-writer 3 through the antenna section 20 and the wireless processing section 212. The control section 213 then transmits these data to the reader-writer 3 through the wireless processing section 212 and the antenna section 20.

The memory section 214 is constructed by a semiconductor memory such as the above ROM, SRAM (Static RAM), FeRAM (ferroelectric memory). The above control program, various kinds of other programs, and various kinds of data such as ID are enumerated as contents stored to this memory section 214. In the wireless communication IC 21, the radio wave transmitted from the reader-writer 3 is set to an electric power source. Therefore, it is desirable to use a nonvolatile memory such as ROM, a memory such as SRAM, FeRAM having small consumption electric power.

Figure 3:
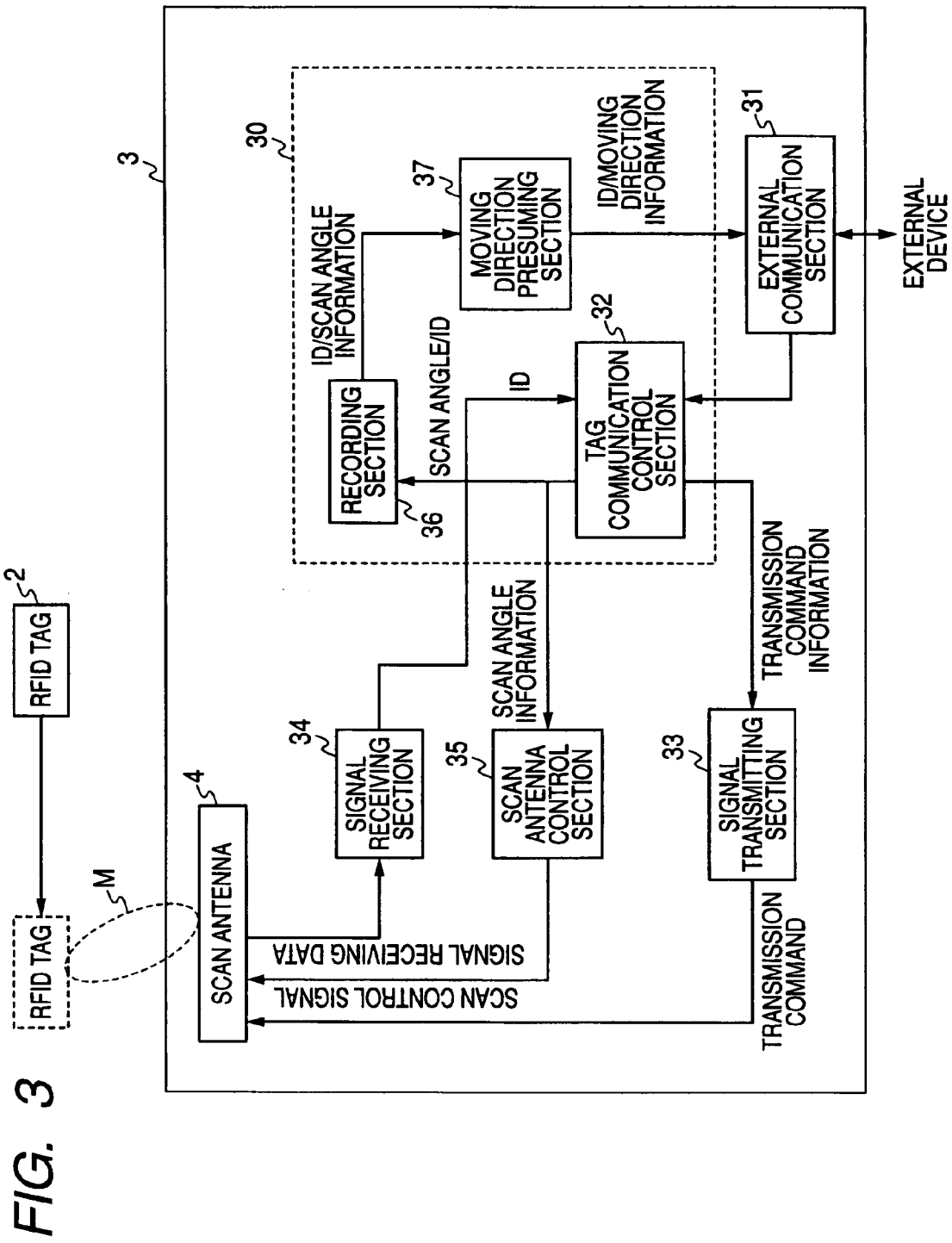
FIG. 3 is a block diagram showing the schematic construction of a reader-writer.
Figure 4:
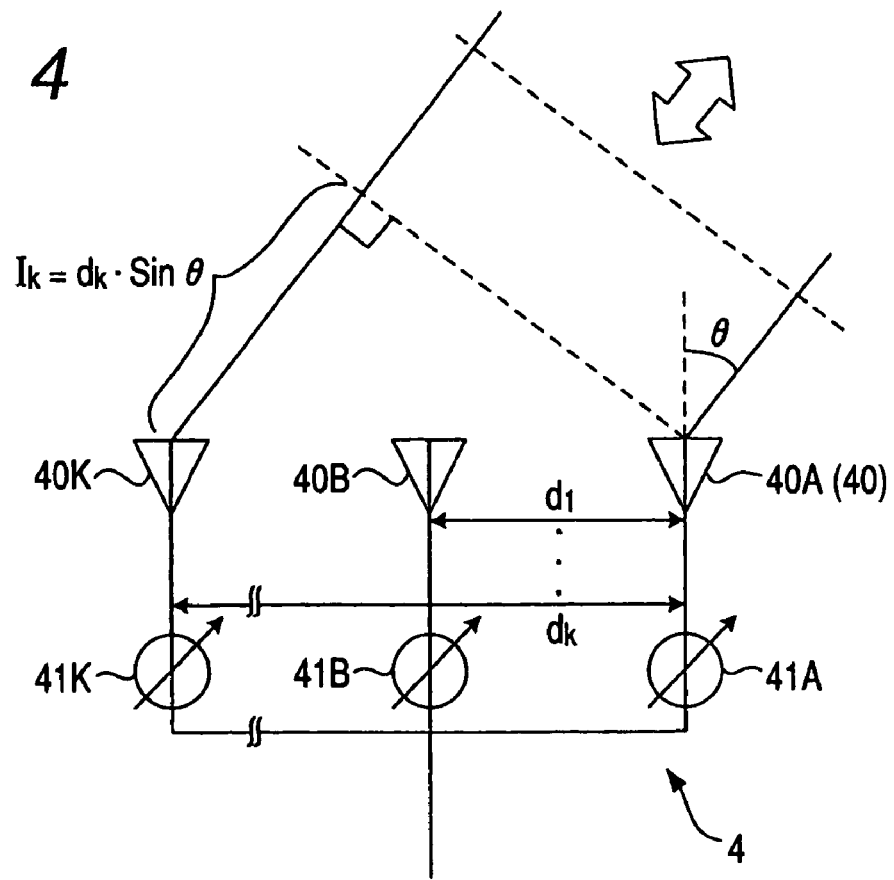
FIG. 4 is a typical view showing the summary of a scan antenna.
Figure 5:
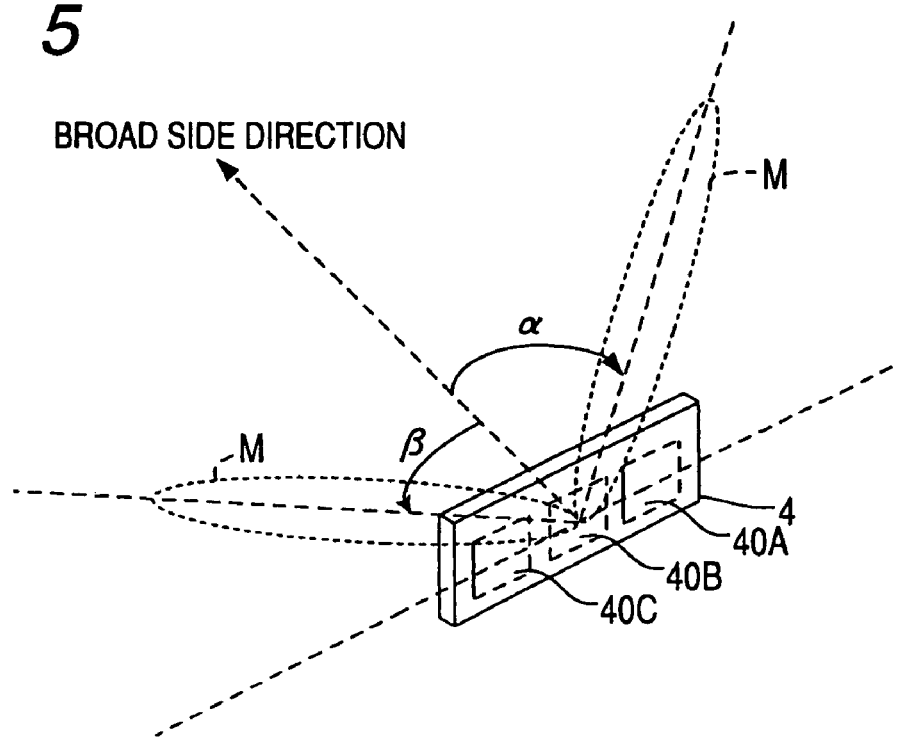
FIG. 5 is a typical view showing a state of scan of the scan antenna.

Next, the construction of the reader-writer will be explained with reference to FIGS. 3 to 7. FIG. 3 is a block diagram showing the schematic construction of the reader-writer. FIG. 4 is a typical view showing a summary of the scan antenna. FIG. 5 is a typical view showing a state of scan of the scan antenna. FIG. 6 is a view showing a scan pattern table. FIG. 7 is a view showing a measuring data table.

A state for performing wireless communication with the RFID tag 2 through the scan antenna 4 is typically shown together in FIG. 3.

The reader-writer 3 has an external communication section 31, a tag communication control section 32, a signal transmitting section 33, a signal receiving section 34, a scan antenna control section 35, a recording section 36, a moving direction presuming section 37 and a scan antenna 4, and is constructed so as to wirelessly communicate with the RFID tag 2. The tag communication control section 32, the recording section 36 and the moving direction presuming section 37 become a main processing section 30, and detection processing of the moving direction of the baggage 5 sticking the RFID tag 2 thereto is performed.

The external communication section 31 is constructed so as to transmit a communication result with the RFID tag 2 such as ID (Identification) of the RFID tag 2 read out in the reader-writer 3, moving direction information of the baggage 5 sticking the RFID tag 2 calculated by the moving direction presuming section 37, and information showing whether writing to the RFID tag 2 is successful or not, to an external device such as a personal computer. The external communication section 31 is also constructed so as to receive writing information (transmission command information) from the external device to the RFID tag 2 and commands (instructions) from the external device. Further, USB (Universal Serial Bus), IEE1394, Ethernet®, etc. are enumerated as an interface standard with the external device.

The tag communication control section 32 receives transmission command information transmitted from the external device through the external communication section 31, and transmits a signal to the signal transmitting section 33. Further, a scan pattern table T1 shown in FIG. 6 is stored to the tag communication control section 32.

Data defining electric power and phases of respective antenna elements 40A, 40B, 40C of the scan antenna 4 are included in this scan pattern table T1. A scan pattern of the scan antenna 4 is generated by electrically setting the electric power and the phases respectively defined with respect to the respective antenna elements 40A, 40B, 40C.

Namely, a scan angle of the scan antenna 4 is set by this scan pattern table T1. As shown in FIG. 5, this scan angle is an inclination angle of a beam M measured with a broad side direction (a direction perpendicular to an array direction of antenna elements 40A, 40B, through 40K) as a reference. In this embodiment mode, a right rotating direction ($\alpha$) within this figure is set to a +value, and a left rotating direction ($\beta$) is set to a − value. This scan table T1 functions as a table for relating scan angles $\alpha$, $\oplus$ and table NO. This table NO. (0, 1) becomes an ordinate axis in a moving direction judging graph G (plot graph) described later.

Further, the tag communication control section 32 reads-out scan angle information from the scan table T1, and transmits this scan angle information to the scan antenna control section 35. Here, scan angles $\alpha$, $\beta$ are set to the scan pattern table T1 as the scan angle information. Accordingly, the tag communication control section 32 sequentially repeatedly transmits the scan angles $\alpha$, $\beta$ to the scan antenna control section 35. The tag communication control section 32 receives ID acquired by the scan antenna 4 from the RFID tag 2, and relates the scan angle ($\alpha$ or $\beta$) of the scan antenna 4 in receiving this ID to this ID, and then transmits the scan angle to the recording section 36. The number of scan angles $\alpha$, $\beta$ are not limited to two, but may be also arbitrarily set in a user.

The signal transmitting section 33 converts transmission command information transmitted from the tag communication control section 32 into a form suitable for wireless signal transmission, and transmits the converted wireless signal (transmission command) to the exterior through the scan antenna 4, and performs processing such as modulation, amplification of the transmission command information. The signal receiving section 34 converts the wireless signal (receiving data) received from the exterior through the scan antenna 4 into an original form, and transmits the converted data to the tag communication control section 32, and performs processing such as amplification, demodulation of the receiving data.

The scan antenna control section 35 receives the scan angle information from the tag communication control section 32, and transmits a scan control signal to the scan antenna 4 on the basis of this received scan angle information, and controls the direction of a beam M of a radio wave radiated from the scan antenna 4. Here, it is set to the scan angles $\alpha$, $\beta$ in the scan pattern table T1. Accordingly, this scan angle information is converted into a scan control signal for sequentially directing the beam M of the radio wave radiated from the scan antenna 4 to the directions of the scan angle $\alpha$ and the scan angle $\beta$, and processing for transmitting this signal to the scan antenna 4 is performed.

The recording section 36 records ID of the RFID tag 2 and the scan angle ($\alpha$, $\beta$) related as mentioned above and transmitted from the tag communication control section 32 to a measuring data table T2 shown in FIG. 7. Further, the recording section 36 performs processing for transmitting these recorded ID of the RFID tag 2 and scan angle information to the moving direction presuming section 37. The measuring data table T2 is constructed from reading NO., reading time, RFID tag NO. and table NO., and data are recorded in a reading order of ID of the RFID tag 2 in the scan antenna 4. Reading NO. shows a reading order of ID of the RFID tag 2, and reading time is reading time information of ID of the RFID tag 2 and is recorded by a clock arranged in the recording section. Here, reading NO. is recorded to the measuring data table T2, but the reading order can be judged by only the reading time. Accordingly, an embodiment mode not recording this reading NO. to the measuring data table T2 can be also applied.

Further, RFID tag NO. is ID read by the scan antenna 4 from the memory section 214 of the RFID tag 2. Table NO. is set correspondingly to the scan angles $\alpha$, $\beta$ in the scan pattern table T1, and becomes an ordinate axis in a moving direction judging graph G described later. FIG. 7 shows a case in which plural pieces of baggage 5 are conveyed and ID is read from plural RFID tags 2. For example, the RFID tag 2 of "0X00011D8C" in RFID tag NO. is read when the direction of the beam M of the radio wave radiated from the scan antenna 4 is the scan angle β. Reading NO. is "1". Namely, this RFID tag 2 is first read in reading processing described later.

The moving direction presuming section 37 is constructed so as to receive information of reading NO., ID, table NO., etc. recorded to the measuring data table T2, and perform moving direction judgment processing described later from this received information, and transmit moving direction information and ID calculated as its result to the external communication section 31.

FIG. 4 is an explanatory view showing a summary of the scan antenna 4. This scan antenna 4 is constructed such that plural antenna elements 40 are arrayed in a straight line shape and a variable phase shifter (phase shifter) 41 is connected to each antenna element 40. In FIGS. 1A to 1C, three antenna elements 40 are arranged, but the number of antenna elements 40 is not limited to three. Further, this antenna element 40 is not limited to a straight line array, but may be also arranged in a two-dimensional array shape. When the number of antenna elements 40 is increased, the width of the beam M is thinned. In this FIG. 4, the number of antenna elements 40 is set to an arbitrary number, and a method of scan of a beam direction in the scan antenna 4 will next be explained with reference to this figure.

When all the antenna elements 40A, 40B, through 40K transmit the radio waves in the same phase, the radio wave radiated from the scan antenna 4 is propagated as a plain wave of the broad side direction (a direction perpendicular to the array direction of antenna elements 40A, 40B, through 40K). On the other hand, the phase of the radio wave transmitted by each of the antenna elements 40A, 40B, through 40K is shifted so as to satisfy the following formula to incline a propagating direction of the radio wave by an angle θ (rad) measured from the broad side direction.

As shown in FIG. 4, the wavelength of the transmitted or received radio wave is set to λ(m), and the distance between the antenna element 40A as a reference and a k-th antenna element 40K is set to $d_k$ (m). The distance between an equal phase face passing the antenna element 40A as a reference among equal phase faces shown by a broken line in FIG. 4 and the k-th antenna element 40K is set to $l_k$ (m). In this case, a shift $\phi_k$ of the phase of the k-th antenna element 40K with respect to the phase of the antenna element 40A as a reference is provided by the following formula.

$$\phi_k = (l_k/\lambda) \times 2\pi = (d_k \times \sin\theta/\lambda) \times 2\pi$$

Thus, the scan antenna 4 can direct the beam M of the radio wave to a target direction by shifting the phase of a signal by each of the phase shifters 41A, 41B, through 41K so as to satisfy the above formula. On the other hand, when the radio wave is received, the direction of the received radio wave can be distinguished by detecting the shift of the phase of each of the antenna elements 40A, 40B, through 40K.

The operation of the RFID communication system 1 constructed in this way will next be explained with reference to FIGS. 8A and 8B. FIG. 8A is a flow chart showing scan processing and moving direction judgment processing. FIG. 8B is a flow chart showing the moving direction judgment processing among these processings. In the summary of the operation in the RFID communication system 1, the scan processing is first performed to scan the scan antenna 4. Next, the moving direction judgment processing is performed on the basis of its scanning result, and the moving direction of the RFID tag 2 is detected. These processings will next be explained in detail.

<Scan Processing>

The scan processing is started when the tag communication control section 32 receives transmission command information transmitted from the external device through the external communication section 31. When this scan processing is started, the tag communication control section 32 transmits scan angle information to the scan antenna 4 on the basis of the scan pattern table T1. In this embodiment mode, the scan angle is set to two angles of α and β.

Concretely, when the scan angle=α is first transmitted as the scan angle information from the tag communication control section 32 to the scan antenna control section 35 (S801), the scan antenna control section 35 transmits a scan control signal to the scan antenna 4 so as to direct the beam M of the radio wave transmitted from the scan antenna 4 to the direction of the scan angle=α. The scan antenna 4 receiving this signal performs reading processing for radiating the beam M toward the scan angle=α (S802). As a result of this reading processing, it is examined whether there is a RFID tag 2 or not. Namely, it is examined whether there is reading of ID from the RFID tag 2 or not (S803). When there is reading of ID (Y of S803), this ID and the scan angle information (scan angle α) are related and recorded to the measuring data table T2 together with reading NO. (S804). Then, it is switched to scan angle=β, and similar processing is next repeated during a predetermined time. Thereafter, it proceeds to the moving direction judgment processing.

On the other hand, when there is no RFID tag 2, i.e., when there is no receiving information from the RFID tag 2 as an executing result of the above reading processing, or when no signal from the tag can be normally received (N of S803), the scan angle information is switched to β and processings similar to the above (S801 to S804) are performed (S805 to S808). When these processings are repeated during a predetermined time, it next proceeds to the moving direction judgment processing so as to detect the moving direction of the baggage 5. For example, a period of transfer of the moving direction judgment processing from this scan processing may be also determined by a recording number of ID such as a recording time point of twentieth ID after ID is first stored to the measuring data table T2. Further, this period may be also determined by an elapsed time such as an elapsed time point of 150 ms from a recording time point of first ID. The time point of this transfer may be set to the recording section 36 in advance, or may be also received as a command transmitted from the external device of PC, etc.

The scan processing and the moving direction judgment processing are parallel processings, and the scan processing is repeatedly performed even when the moving direction judgment processing is performed. In this embodiment mode, as mentioned above, the scan processing and the moving direction judgment processing are set to parallel processings so as to perform high speed processing. However, the scan processing and the moving direction judgment processing are not limited to the parallel processings in this way, but a construction for performing the scan processing and the moving direction judgment processing in series can be also applied.

<Moving Direction Judgment Processing>

When a predetermined time has passed or predetermined number of processing is executed after first ID is recorded to the measuring data table T2 by the above scan processing, this moving direction judgment processing is started. When this processing is started, the measuring data table T2 recorded to the recording section 36 is read out by the moving direction presuming section 37 (S810). This read-out measuring data table T2 is temporarily stored to a buffer, etc., and the moving direction is calculated on the basis of information of this stored measuring data table T2 (S811).

This moving direction is calculated as follows. A first moving direction calculating table T3 shown in FIG. 9A is generated from reading NO. and table NO. among information read out of the measuring data table T2. This moving direction calculating table T3 is constructed by x (reading NO.), y (table NO.), a multiplying value x*y of these x and y, and a square value x*x of x. A second moving direction calculating table T4 is then generated by using this first moving direction calculating table T3. This second moving direction calculating table T4 is constructed by Σx as a sum of numerical values from a first term (reading NO. 1) of x to a twentieth term (reading NO. 20), Σy as a sum of numerical values from a first row of y to a twentieth row, Σx*y as a sum of numerical values from a first row of x*y to a twentieth row, 20*Σx*y as a product of 20 as a value of reading NO. of a final row of x and Σx*y, Σx*x as a sum of numerical values from a first row of x*x to a twentieth row, and 20*Σx*x as a product of 20 as a value of reading NO. of a final row of x and Σx*x.

When each value of this second moving direction calculating table T4 is substituted into the following moving direction calculating formula and is calculated, the value of 0.0639 shown in FIG. 9B is calculated. An inclination value S as a value calculated by the following moving direction calculating formula becomes a value for calculating the inclination of a linear approximate straight line L described later.

[Moving direction calculating formula] [Formula 1]

$$\frac{\sum x \sum y - N \sum xy}{\sum x \sum x - N \sum xx}$$

In the explanation of the above moving direction calculation, reading NO. is set to 1 to 20. Namely, a case for reading ID 20 times from the RFID tag 2 by the reader-writer 3 is set. However, the present invention is not limited to this case, but the inclination may be calculated in accordance with its reading number with N of the above moving direction calculating formula as its number of times.

Figure 10:
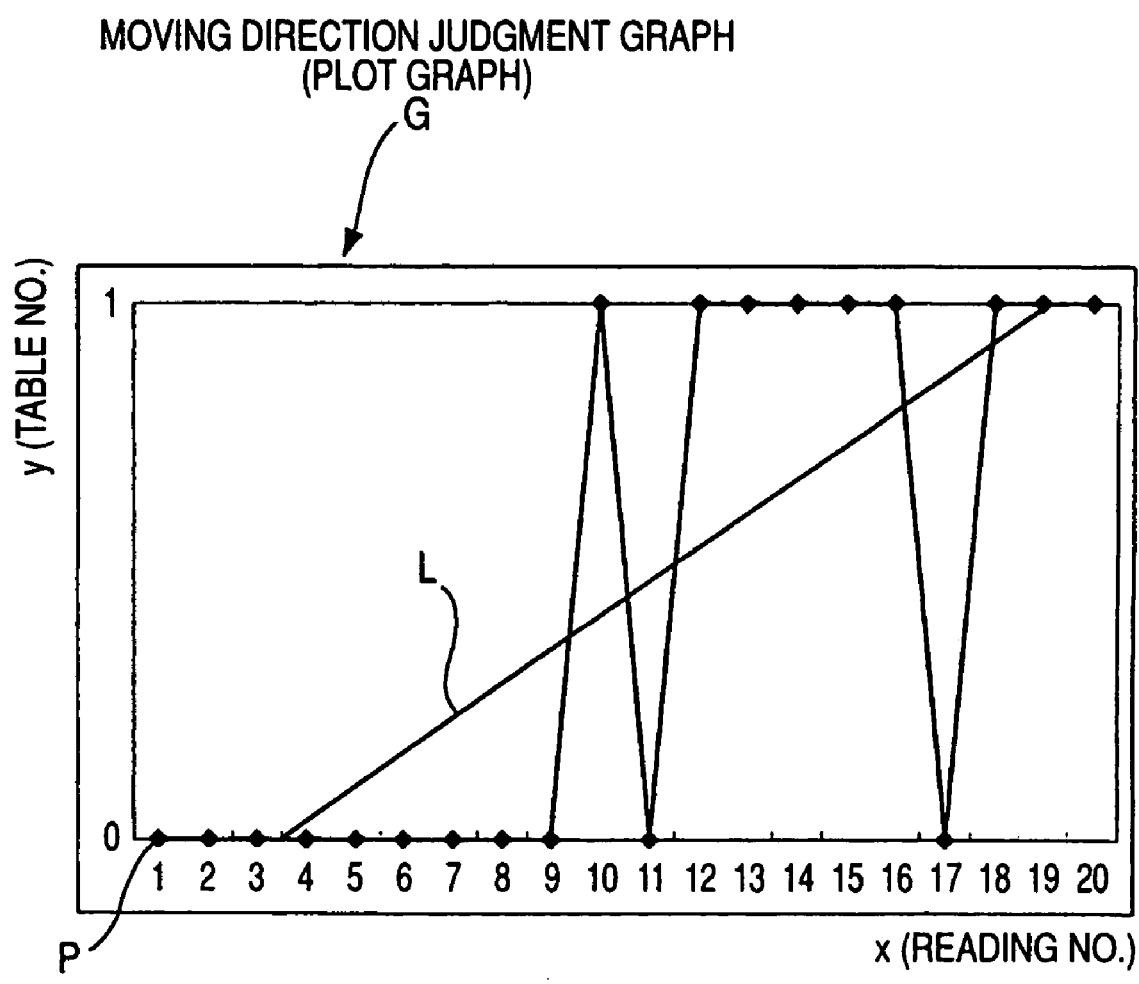
FIG. 10 is a view showing a moving direction judging graph.

Here, the calculation of this inclination value S means that the moving direction judging graph G as shown in FIG. 10 is generated in data, and the linear approximate straight line L is calculated from this graph, and the inclination of this calculated linear approximate straight line L is calculated. Concretely, in an xy coordinate system in which y as table NO. is set to an ordinate axis, and x as reading NO. is set to an abscissa axis, the values of each x and y of the moving direction calculating table T3 are respectively set to xy coordinates and this moving direction judging graph G is generated by plotting these values in this xy coordinate system. The linear approximate straight line L is then calculated from this moving direction judging graph G, and the inclination of this linear approximate straight line L is calculated. If the inclination of the linear approximate straight line L shown in FIG. 10 is a right shoulder rise within FIG. 10, the inclination value S becomes a plus value. On the other hand, if the inclination of the linear approximate straight line L shown in FIG. 10 is a left shoulder rise, the inclination value S becomes a minus value. If the value of this inclination value S is a plus value, it is defined in advance that the baggage 5 is moved in direction →A within FIGS. 1A to 1C. In contrast to this, if the value of the inclination value S is a minus value, it is defined in advance that the baggage 5 is moved in direction ←B. In this case, the moving direction of the baggage 5 can be detected by calculating this inclination value S.

When the moving direction calculation is made as mentioned above and its moving direction is detected, this calculated moving direction is notified from the moving direction presuming section 37 to the external device through the external communication section 31 (S812), and the moving direction judgment processing is terminated.

Moving direction information calculated by the above moving direction calculation, i.e., the minus value or plus value with respect to the inclination value S is converted into e.g., 0 in the case of the minus value, and 1 in the case of the plus value. Information of this converted 1 and 0 is related to ID of each RFID tag 2 of the measuring data table T2 temporarily stored to the moving direction presuming section 37, and this related ID is transmitted to the external device through the external communication section 31.

Accordingly, in the external device, it is possible to detect direction which baggage 5 is moved.

The present inventors actually have detected the moving direction of the RFID tag 2 by utilizing the RFID communication system 1. Accordingly, its experimental result will be next explained with reference to FIGS. 11 to 15.

Figure 11:
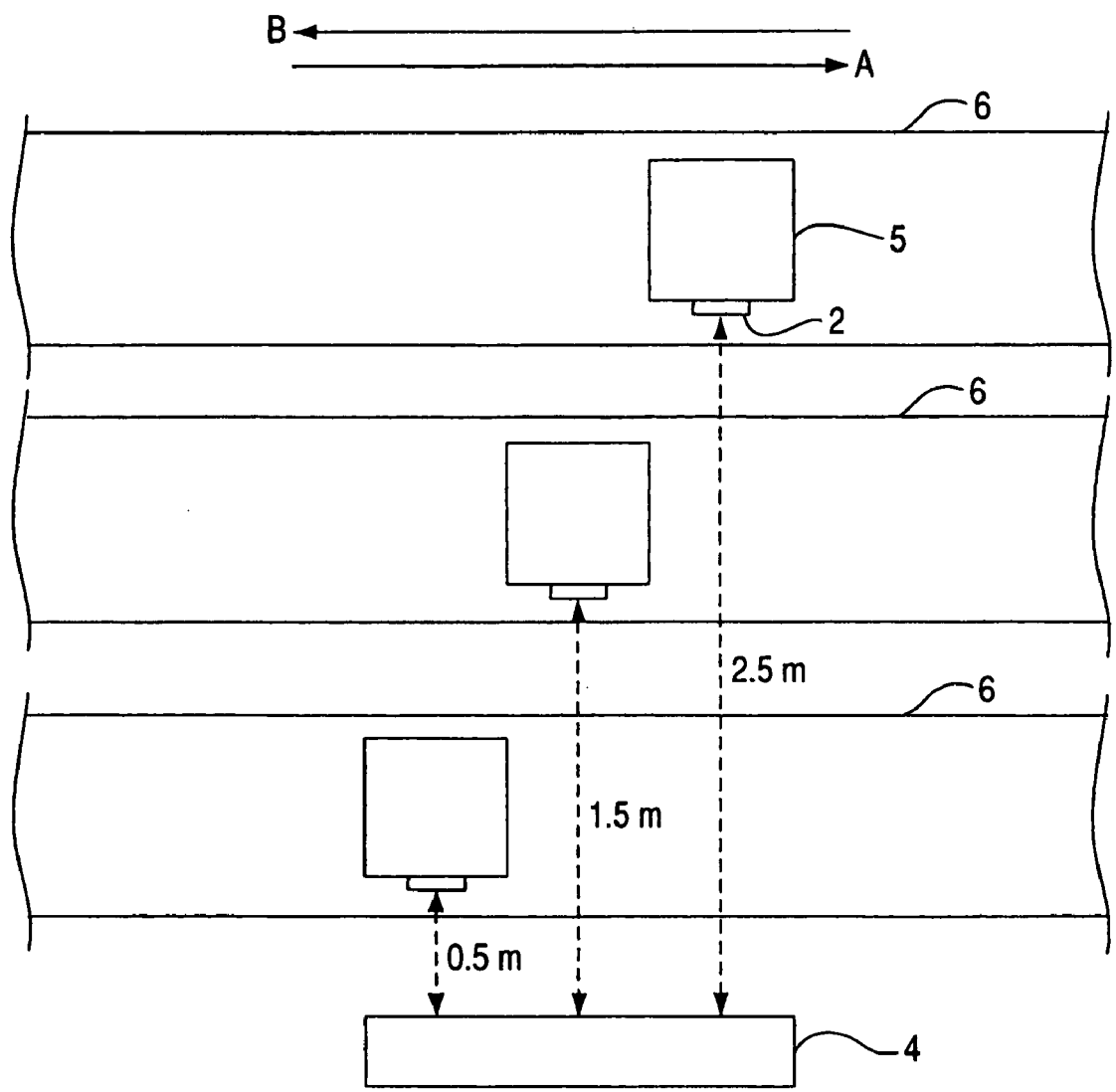
FIG. 11 is a view showing the distance between the scan antenna and the RFID tag in a moving direction detecting experiment.
Figure 12:
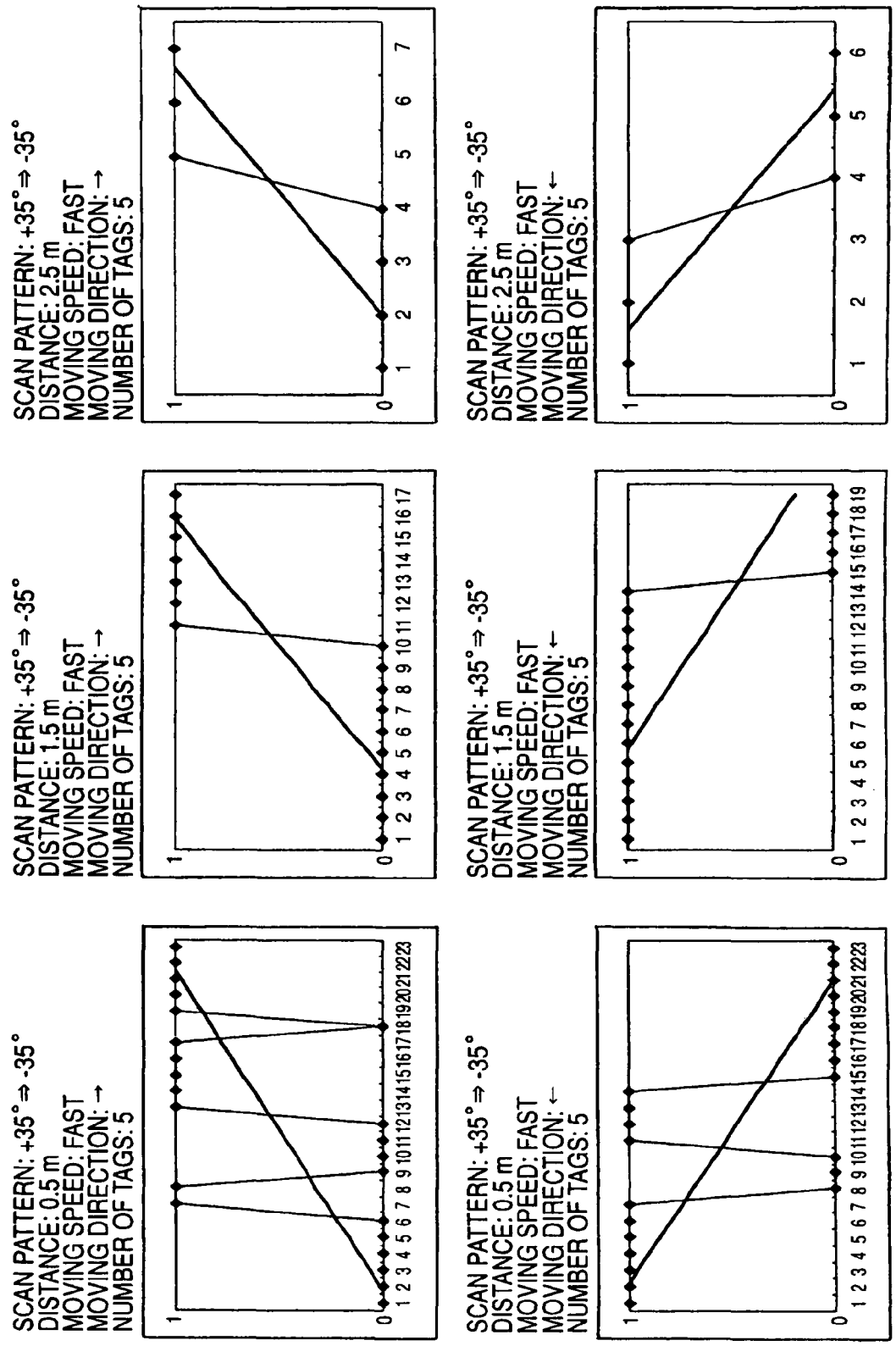
FIG. 12 is a view showing the moving direction judging graph showing a result of the moving direction detecting experiment.
Figure 13:
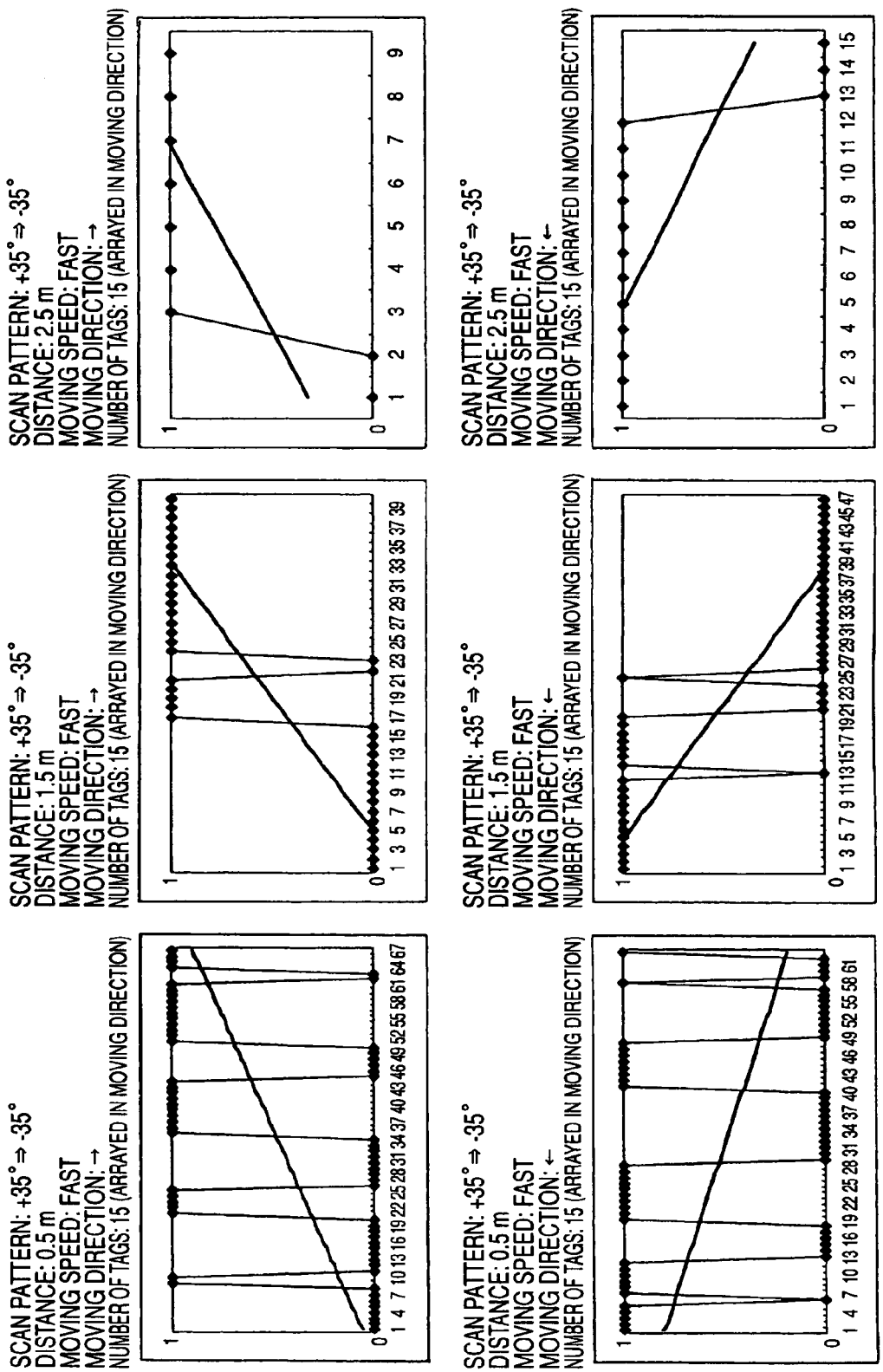
FIG. 13 is a view showing the moving direction judging graph showing a result of the moving direction detecting experiment.
Figure 14:
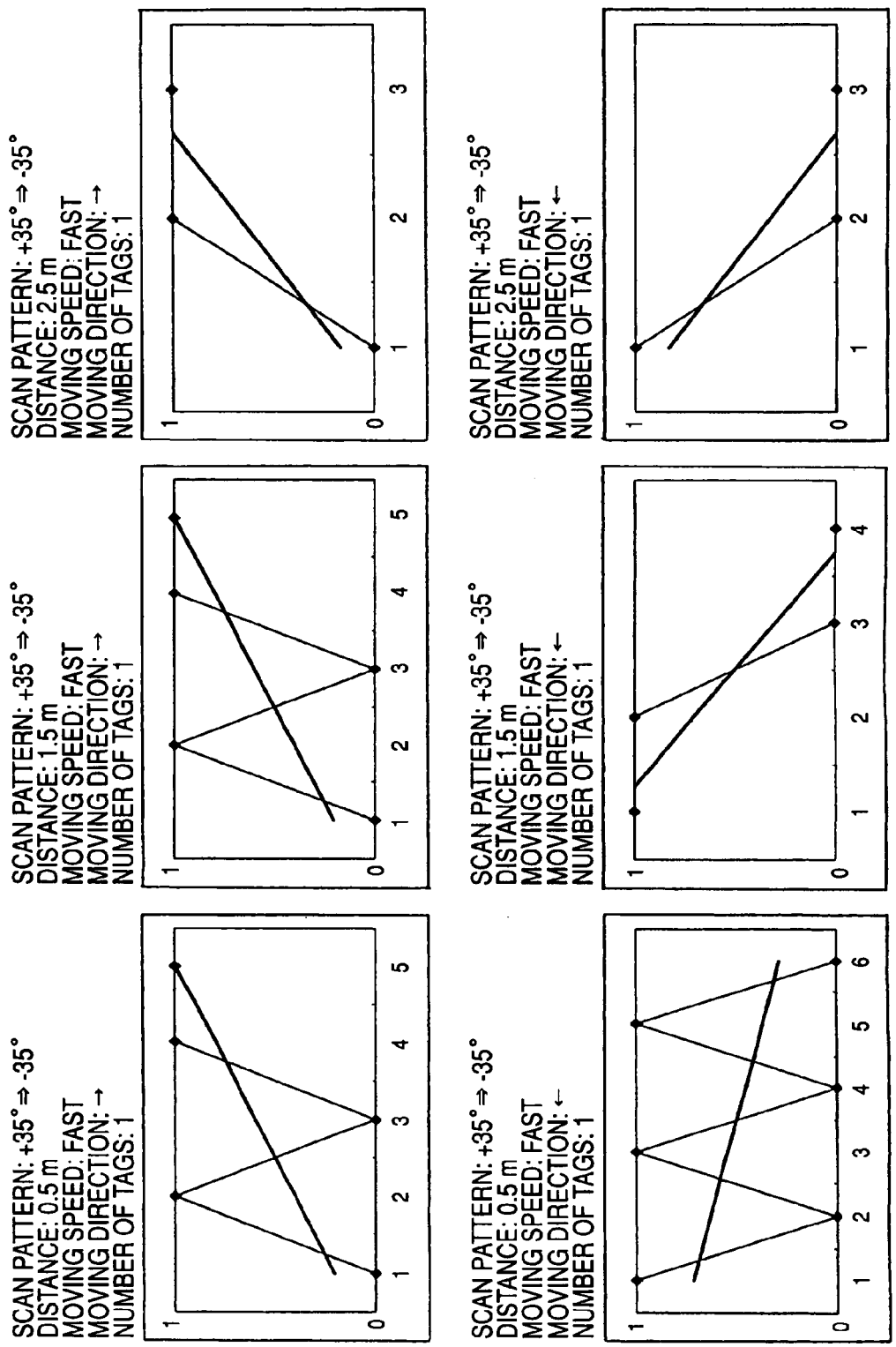
FIG. 14 is a view showing the moving direction judging graph showing a result of the moving direction detecting experiment.
Figure 15:
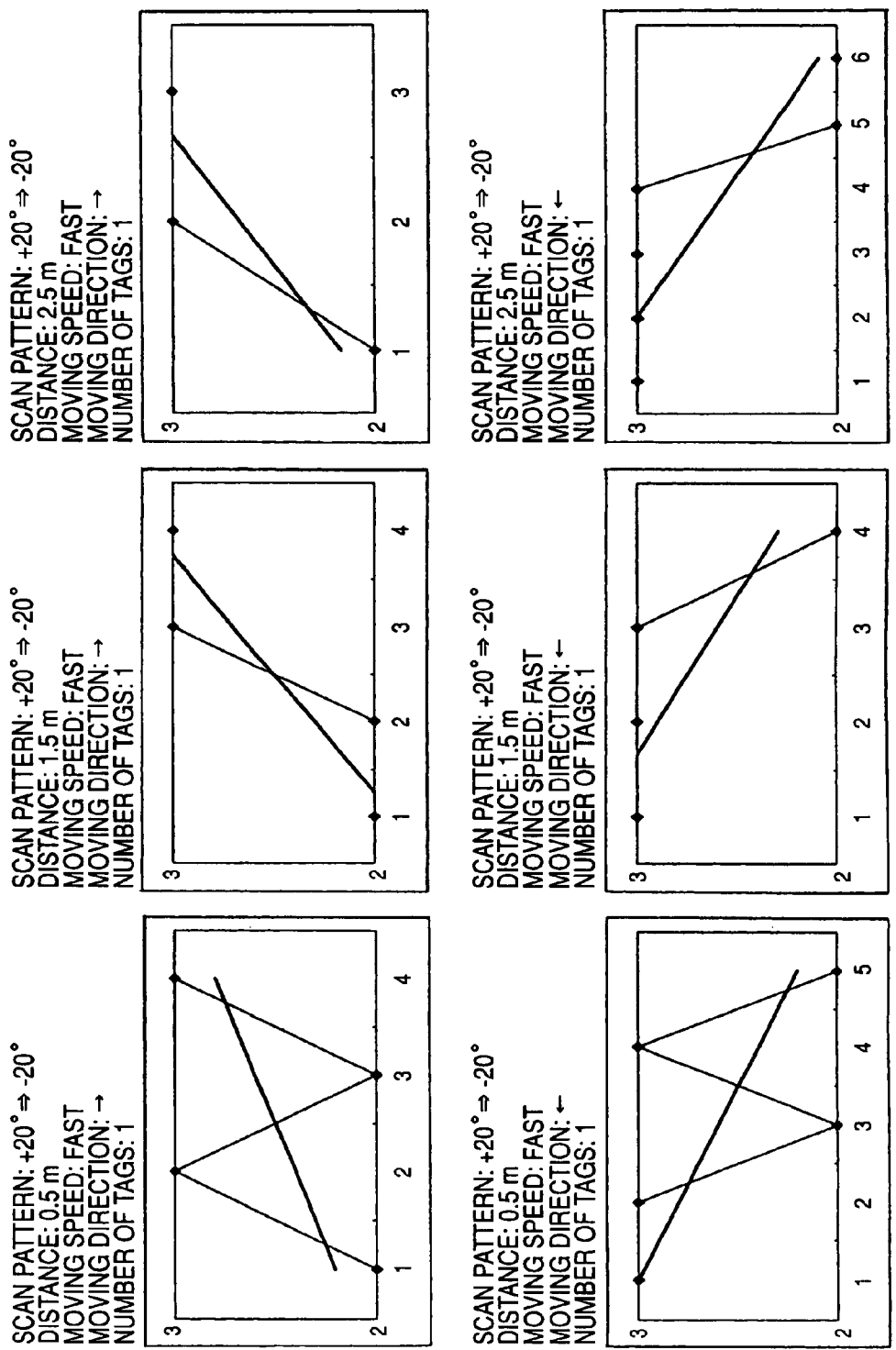
FIG. 15 is a view showing the moving direction judging graph showing a result of the moving direction detecting experiment.

As shown in FIG. 11, the present inventors set the distance between the scan antenna 4 and the RFID tag 2 stuck to the baggage 5 such that this distance is about 0.5 m, 1.5 m or 2.5 m and the baggage 5 is conveyed on the belt conveyer 6. Thereafter, the present inventors detect the moving direction of the baggage 5 by utilizing the RFID communication system 1, i.e., whether the baggage 5 is moved in direction →A within FIGS. 1A to 1C or is moved in direction ←B.

Further, a case for independently conveying one piece of baggage 5 on the belt conveyer, and a case for collectively conveying plural pieces of baggage 5 are supposed. An experiment is made with respect to three patterns of one, five and fifteen in the number of RFID tags 2. The scan angle for determining the scan pattern is set to α=35' and β=−35°. However, when the number of RFID tags 2 is only one, the experiment is also made with respect to a case set to α=20° and β=−20°. This set scan angle is repeatedly swept. A speed is set to a speed at which the RFID tag 2 runs through in front of the scan antenna 4. A transfer period to the moving direction judgment processing is set to a period after 50 ms have passed from a first reading time point of ID. In the experiment, a Mono-Static reader-writer is used as the reader-writer 3.

In FIGS. 12 to 15, an upper stage shows a case in which the moving direction of the RFID tag 2 is direction →A, and a lower stage shows a case in which its moving direction is direction ←B. With reference to these figures, it is understood that plots P are many when the distance between the scan antenna 4 and the RFID tag 2 is close. Further, it is understood that plots P are many when the number of RFID tags 2 is increased. In the Mono-Static reader, a communication distance is about 3 m. Therefore, the reading number of the RFID tag 2 attaining about 2.5 m in communication distance is reduced.

Further, in addition to these experiments, an experiment is also made with respect to a case for slowing-down a moving speed and a case for setting time until the transfer period to be long. It is understood that plots P are increased and reliability of a judgment of the inclination is increased when the moving speed is slow. Further, when the moving speed is fast, it is understood that this inclination becomes steep. On the other hand, when the transfer period is set to be long, it is also understood that plots P are increased, but time is correspondingly unnecessarily taken until the moving direction is calculated.

As mentioned above, in the RFID communication system 1 applying the present invention thereto, it is sufficient for the scan antenna 4 to repeatedly perform scan. If ID is read from the RFID tag 2 by this scan, its moving direction is constructed so as to be detected. Thus, the moving direction of the baggage 5 sticking the RFID tag 2 thereto can be simply detected without requiring complicated scan control of the scan antenna 4 as in the technique disclosed in JP-A-2005-345198.

Further, the linear approximate straight line L is calculated by utilizing plot data generated by reading NO. and table NO., and the moving direction is detected by calculating its inclination value S. Namely, the moving direction can be detected irrespective of ID read from the RFID tag 2. Thus, for example, even when plural pieces of baggage 5 are simultaneously conveyed and the RFID tag 2 among the baggage 5 is read only once, the moving direction can be detected if ID can be read from other RFID tags 2. Accordingly, no moving direction is judged in error.

Further, when the baggage 5 is conveyed at high speed, the reading number of the RFID tag 2 can be increased by merely adjusting the speed of scan in accordance with its speed. As its result, accuracy of detection of the moving direction can be easily improved.

Figure 16:
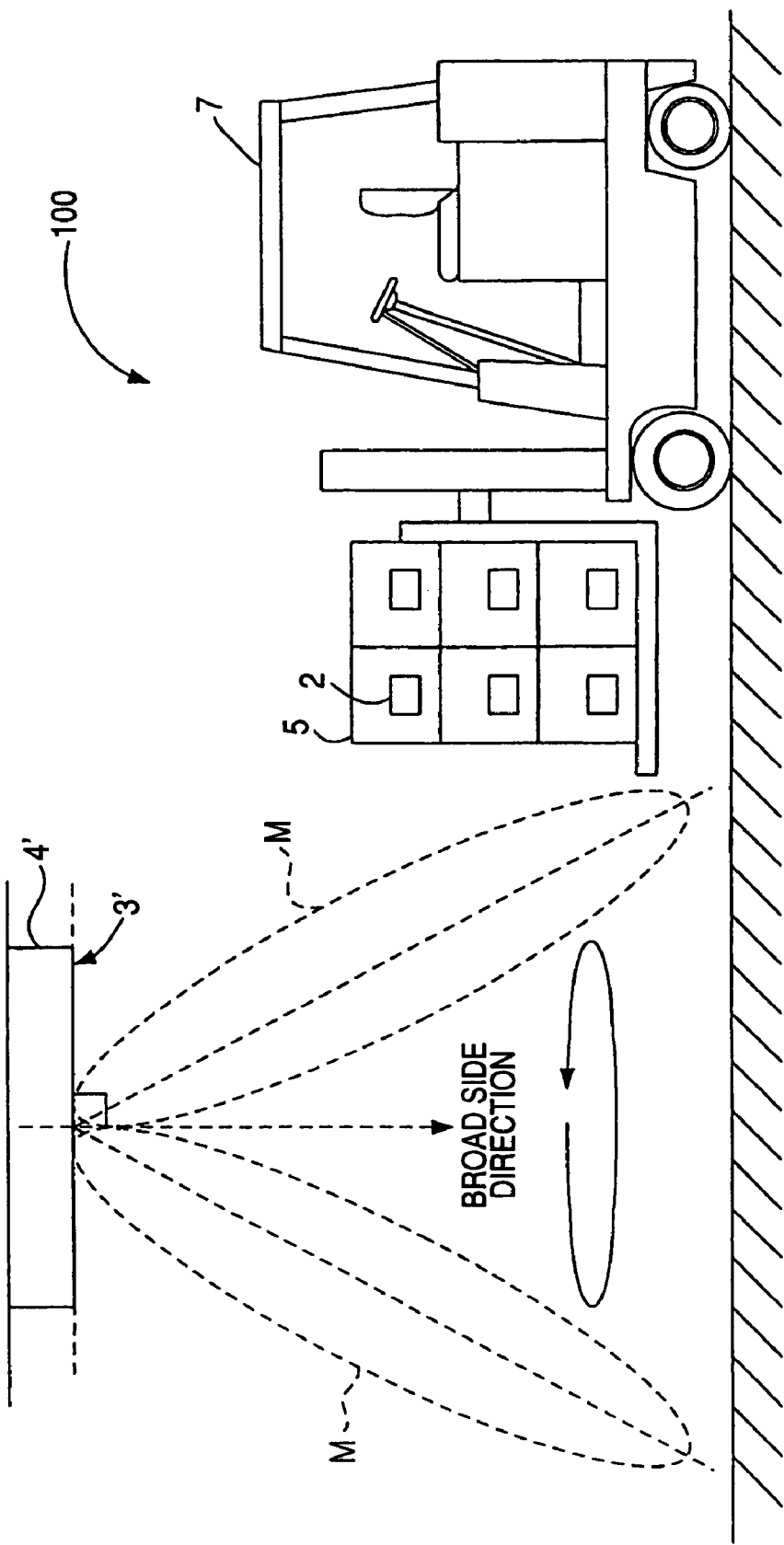
FIG. 16 is an explanatory view showing the summary of another embodiment mode of the RFID communication system applying the present invention thereto.
Figure 17:
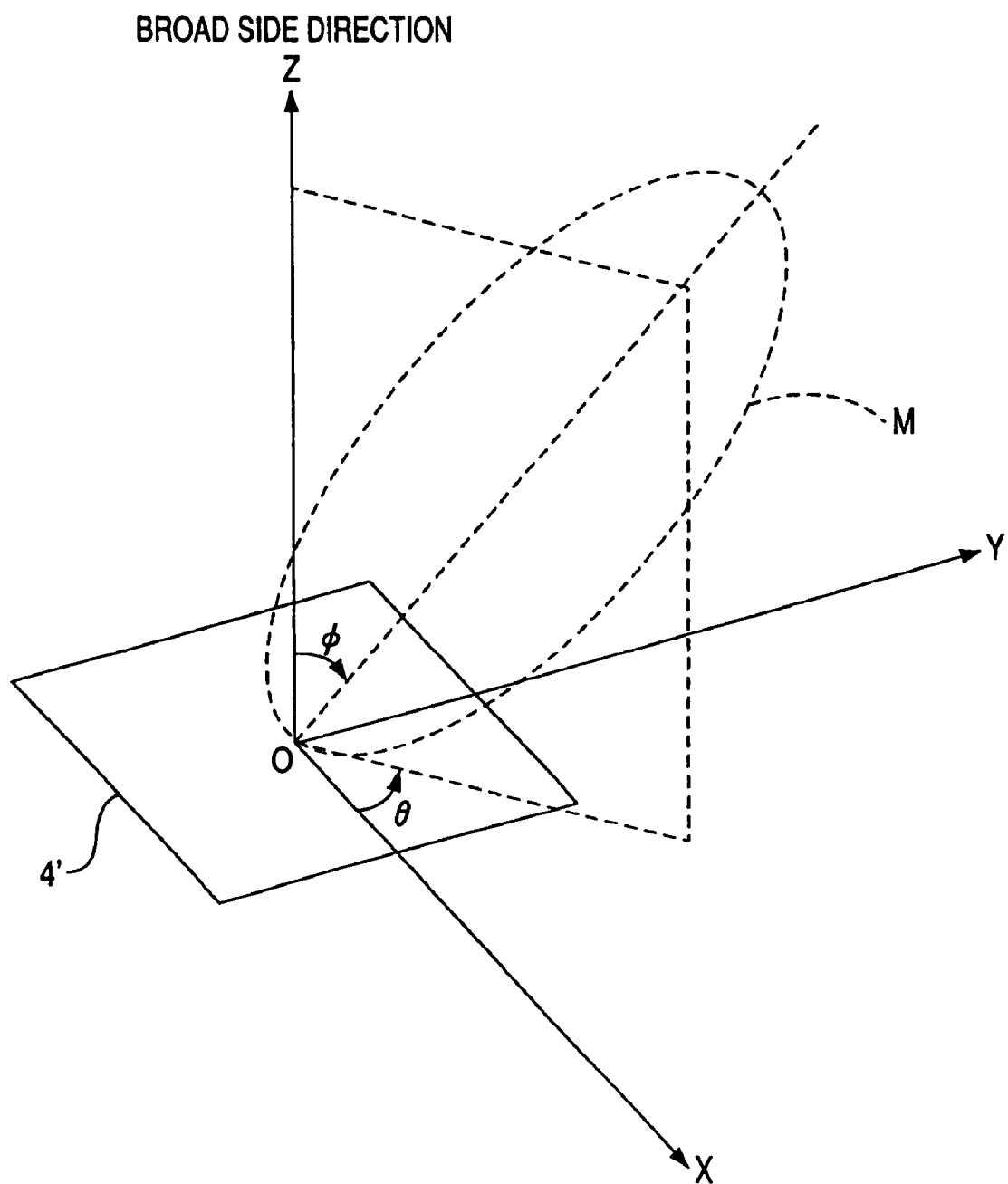
FIG. 17 is an explanatory view typically showing the direction of a beam of a radio wave transmitted from the scan antenna.
Figure 18A:
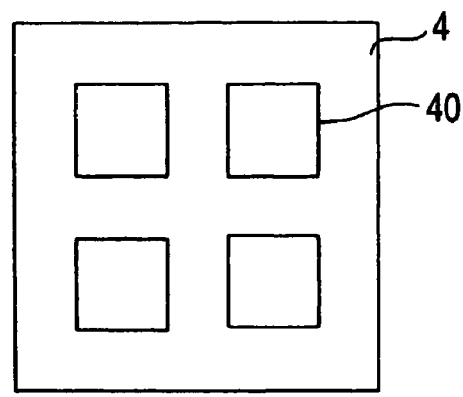
FIGS. 18A to 18C are front views typically showing an array example of antenna elements of the scan antenna in another embodiment mode.
Figure 18B:
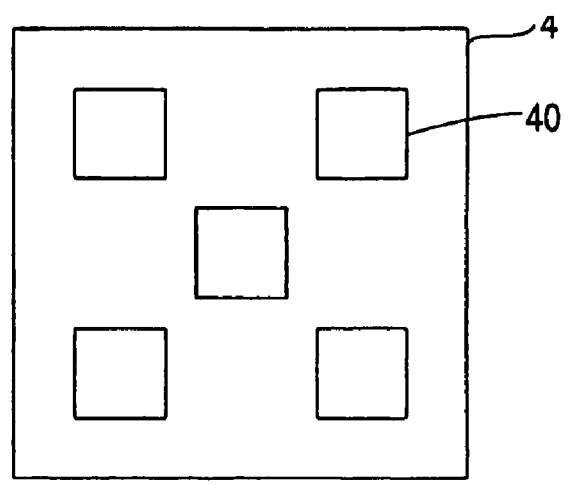
Figure 18C:
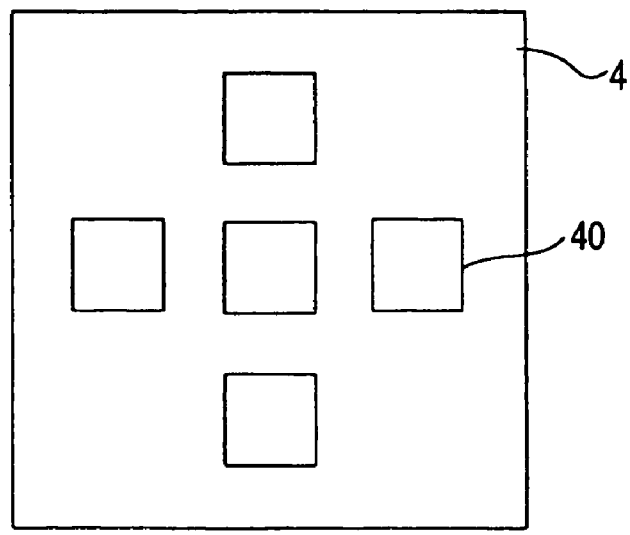
Figure 22:
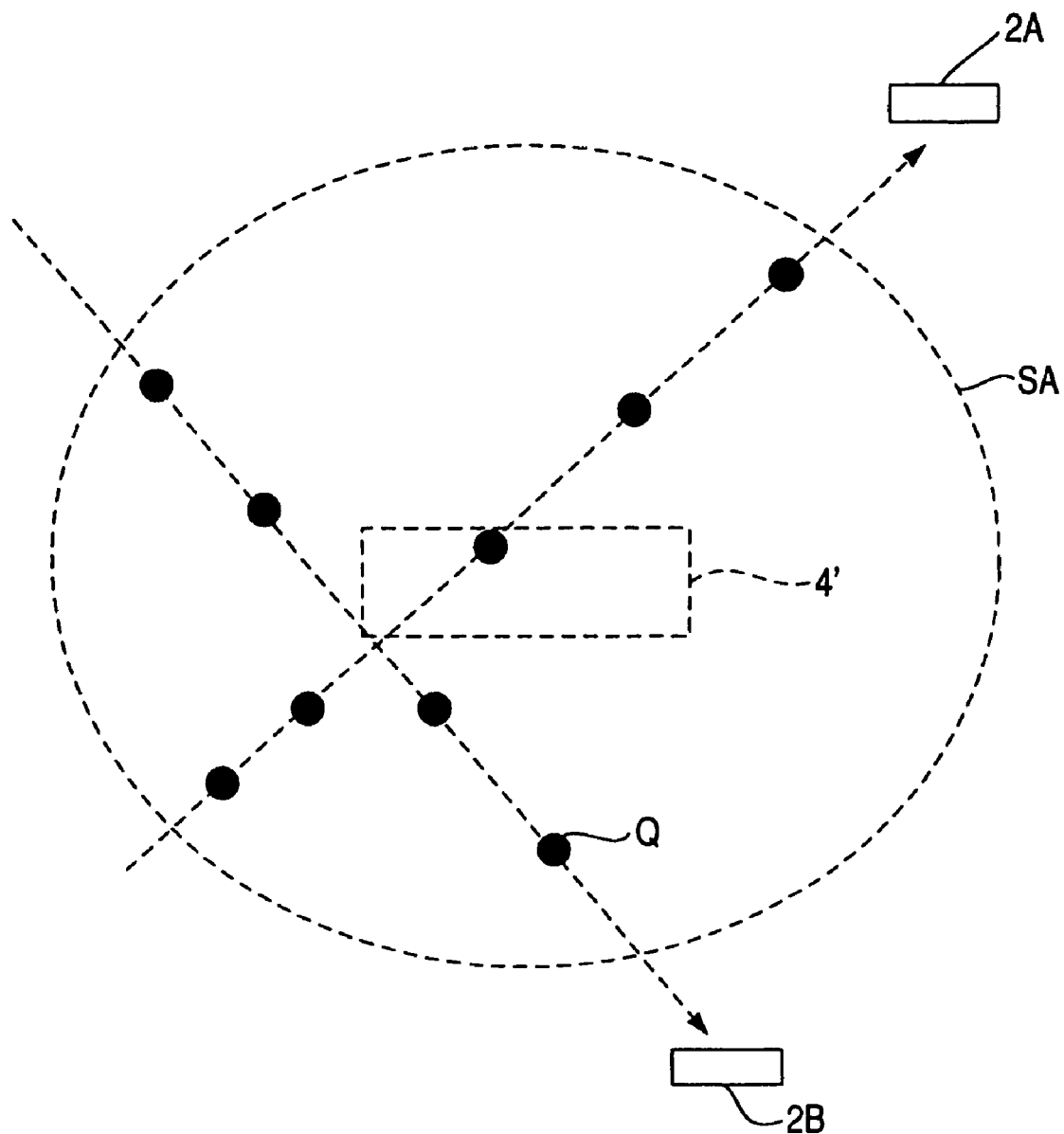
FIG. 22 is a typical view showing a movement detecting example of a tag in another embodiment mode.

Another embodiment mode of the RFID communication system applying the present invention thereto will next be explained with reference to FIGS. 16 to 22. FIG. 16 is an explanatory view showing the summary of a RFID communication system 100. FIG. 17 is an explanatory view typically showing the direction of the beam M of the radio wave transmitted from the scan antenna 4. FIGS. 18A to 18C are front views typically showing an array example of the antenna element 40 of the scan antenna 4. FIG. 19 is a typical view in which the situation of scan is seen from above. FIG. 20 is a view showing a measuring data table. FIG. 21 is a view showing a moving direction judging graph. FIG. 22 is a typical view showing a movement detecting example of the RFID tag 2.

In the RFID communication system 100 in this embodiment mode, as shown in FIG. 16, a reader-writer 3' is arranged in a ceiling of a factory, etc., and a scan antenna 4' is arranged so as to radiate the beam M of a radio wave transmitted downward (floor face direction). As another embodiment mode, the antenna is arranged on a floor face, and the beam may be also constructed so as to be emitted toward a ceiling direction. On the other hand, plural pieces of baggage 5 are placed in a fork lift 7, and the RFID tag 2 is stuck to each baggage 5. When this fork lift 7 passes the interior of a scan area SA (see FIG. 19) of the scan antenna 4', ID is read from the RFID tag 2 by the scan antenna 4', and the moving direction is then detected. An explanation will next be made in detail.

The construction of the RFID tag 2 is a construction similar to that of the RFID tag 2 in the above first embodiment mode.

The construction of the reader-writer 3' is also about the same as the construction shown in FIG. 3. However, this embodiment mode differs from the above first embodiment mode in a technique of the moving direction calculation in the moving direction presuming section 37 and the construction of the scan antenna 4'.

As shown in FIG. 4, the scan antenna 4' is constructed from plural phase shifters 41A, 41B, through plural antenna elements 40A, 40B, and an unillustrated distributing synthesizing device. A principle for scanning the transmitted beam M is similar to that explained in the above first embodiment mode. However, in this embodiment mode, differing from the above first embodiment mode, plural antenna elements 40 are two-dimensionally arrayed as shown in FIGS. 18A to 18C, and are constructed so as to perform two-dimensional scan. Namely, when a floor face is set to an XY plane, the beam M radiated from the scan antenna 4' is constructed so as to be scanned on an X-direction side and a Y-direction side. For example, the array of these plural antenna elements is 40 is shown in FIGS. 18A to 18C, but the present invention is not limited to this array. Another array can be also applied if this array is an array able to scan the beam M in both the directions of the X-direction side and the Y-direction side.

In the scan antenna 4' of this embodiment mode, the antenna element 40 is arrayed as shown in FIG. 18B. As shown in FIG. 16, the beam M of the radio wave is constructed so as to be scanned toward the downward direction such that the beam M draws a circle with a broad side direction as a center. FIG. 19 is a typical view in which a situation of this scan is seen from above. Alphabet a within this figure typically shows a direction in which the beam M is instantaneously scanned with the broad side direction shown in FIG. 16 as a central axis. In this embodiment mode, the beam can be scanned in a circular shape as in a scan direction C by sequentially switching the scan angle. When the beam is scanned in this way, the scan area SA, i.e., an area able to read ID from the RFID tag 2 by the scan antenna 4' is formed in a circular shape with respect to the floor face direction.

Here, the scan angle for setting the direction of the beam M in this embodiment mode will be explained by using FIG. 17. FIG. 17 typically shows a state in which the scan antenna 4' set to a certain scan angle radiates the beam M. FIG. 17 also shows a state in which the scan antenna 4' placed in an XY plane shape radiates the beam M in the Z-axis direction (upward) with an inclination of a central angle $\phi$. In this embodiment mode, the beam M is two-dimensionally scanned in a circular shape as mentioned above. Accordingly, its direction is determined by the following parameters. A radiating direction of the beam M is set from two parameters of the central angle $\phi$ as the inclination from the Z-axis (broad side direction), and a rotating angle $\theta$ with respect to the XY plane. The scan angle is constructed by this central angle $\phi$ and the rotating angle $\theta$.

The scan angle defined in this way is set to $\alpha$, and is sequentially switched to $\alpha 1$, $\alpha 2$, through $\alpha 10$ and the scan is repeated in this embodiment mode. As a result of the scan, when ID is read from the RFID tag 2, similar to the first embodiment mode, a measuring data table T5 shown in FIG. 20 is generated. However, the scan angle is stored instead of table NO.

When this scan processing is terminated, the moving direction presuming section 37 reads-out the measuring data table T5, and generates plot data from the read-out scan angle $\alpha$ and time information t. The moving direction presuming section 37 then sequentially plots data to a coordinate system with the scan angle $\alpha$ as an ordinate axis and time t as an abscissa axis on the basis of these plot data, and calculates a moving locus. The moving direction of the RFID tag 2 stuck to the baggage 5 can be detected from this moving locus. As a method for calculating the moving direction from this moving locus, it is sufficient to utilize a publicly known technique. For example, there are a technique described in JP-A-11-66319, etc.

The moving direction is calculated by the moving locus in this way. As a result, for example, the moving direction of the RFID tag 2 is provided as described in FIG. 22. This FIG. 22 shows a typical view in which the moving directions of RFID tag 2A and RFID tag 2B are seen from above. A black point Q shows a spot in which ID is read by the scan antenna 4' within the scan area SA with respect to the respective RFID tags 2A, 2B. Each of the moving directions of the RFID tags 2A, 2B is the direction of an arrow within this figure.

As mentioned above, in the RFID communication system 100 applying the present invention thereto, it is sufficient for the scan antenna 4' to repeatedly perform the scan. If there is reading of ID from the RFID tag 2 by this scan, its moving direction is constructed so as to be detected. Thus, the moving direction of the baggage 5 sticking the RFID tag 2 can be simply detected without requiring complicated scan control of the scan antenna 4' as in the technique disclosed in JP-A-2005-345198.

Further, the moving direction is detected by calculating the moving locus by utilizing the plot data generated from the scan angle α and the reading time t. Namely, the moving direction can be detected irrespective of ID read from the RFID tag 2. Thus, for example, even when plural pieces of baggage are simultaneously conveyed and the RFID tag 2 among the baggage 5 is read only once, the moving direction can be detected if ID is read from another RFID tag 2. Accordingly, no moving direction is judged in error.

Further, when the baggage 5 is conveyed at high speed, the reading number of the RFID tag 2 can be increased by merely adjusting the speed of scan in accordance with its speed. As a result, accuracy of detection of the moving direction can be easily improved.

Moreover, the transmitted beam M of the scan antenna 4' is two-dimensionally scanned in a circular shape, etc., and the moving direction of the baggage 5 sticking the RFID tag 2 thereto is detected by the moving locus. Thus, a two-dimensional movement of the baggage 5 sticking the RFID tag 2 thereto, i.e., a movement to the X-direction and a movement to the Y-direction in the XY plane can be simultaneously detected.

The present invention is not limited to the above embodiment mode. For example, if the scan antenna 4 is arranged in an entrance of a supermarket, a CD shop, etc. and the RFID tag 2 is stuck to each article of commerce, unfair carrying-out (theft), etc. can be prevented. Further, if the scan antenna 4 is arranged in an entrance of a rental space, etc. and the RFID tag 2 is attached to a human being and an animal, going-in and leaving of the human being and the animal can be detected and the present invention can be also applied to a system of time rental, etc. of the rental space.

What is claimed is:

1. A tag communication device for performing wireless communications with a radio frequency identification (RFID) tag attached to a moving body via a radio wave, the tag communication device comprising:
    an antenna that receives a plurality of information signals read from the RFID tag, each of the information signals including at least a tag identification, wherein the antenna is a scan antenna, having a plurality of antenna elements and wherein the scan antenna scans an area including a path of the RFID tag; and
    a moving detection section for determining a moving direction of the RFID tag based on the plurality of information signals received by the antenna and time information corresponding to each of the wireless communications,
    wherein the moving detection section is configured to calculate a linear approximate straight line to show the relation between a scan angle and the time information, and the moving detection section is configured to determine the moving direction of the RFID tag based on an inclination of the linear approximate straight line.

2. The tag communication device according to claim 1, wherein the time information specifies a time at which the RFID tag and the tag communication device performed the associated wireless communication.

3. The tag communication device according to claim 1, wherein the moving detection section determines the moving direction of the RFID tag based on a plurality of scan angles used by the scan antenna for scanning.

4. The tag communication device according to claim 1, wherein the moving detection section determines the moving direction of the RFID tag by calculating a moving locus of the RFID tag.

5. The tag communication device according to claim 1, wherein the antenna elements are two-dimensionally arrayed, and the scan antenna performs a two-dimensional scan of the path of the RFID tag.

6. The tag communication device according to claim 1, wherein elements of the antenna are constructed by a patch antenna.

7. The tag communication device according to claim 1, wherein the moving detection section calculates the moving direction of the RFID tag based on a plurality of sets of position information, wherein the position information has information relating to a position of the RFID tag.

8. The tag communication device according to claim 1, wherein the antenna scans a plurality of areas, based on a plurality of scan angles, to determine whether a RFID tag is present and the tag communication device determines the location of the RFID tag based on whether information signals are received from the RFID tag at each particular scan angle.

9. A tag communication system comprising:
    a radio frequency identification (RFID) tag; and
    a tag communication device that communicates with the RFID tag via wireless communications, the tag communication device further comprising:
        an antenna that receives a plurality of information signals read from the RFID tag, each of the information signals including at least a tag identification, wherein the antenna is a scan antenna having a plurality of antenna elements and the scan antenna scans an area including a path of the RFID tag; and
        a moving detection section for determining a moving direction of the RFID tag based on the plurality of information signals received by the antenna and time information corresponding to each of the wireless communications,
        wherein the moving detection section is configured to calculate a linear approximate straight line to show the relation between a scan angle scanned by the scan antenna and the time information, and the moving detection section is configured to determine the moving direction of the RFID tag based on an inclination of the linear approximate straight line.

10. The system according to claim 9, wherein the time information specifies a time at which the RFID tag and the tag communication device performed the associated wireless communication.

11. The system according to claim 9, wherein the moving detection section calculates the moving direction of the RFID tag based on a plurality of sets of position information, wherein the position information has information relating to a position of the RFID tag.

12. The system according to claim 9, wherein the scan antenna receives a scan control signal based on the scan angle and scans for the RFID tag based on the scan control signal.

13. The system according to claim 9, wherein the antenna elements are two-dimensionally arrayed, and the scan antenna performs a two-dimensional scan of a path of the RFID tag.

14. A method of determining the moving direction of a radio frequency identification (RFID) tag comprising:
receiving a plurality of signals from the RFID tag;
receiving time information corresponding to each of the plurality of signals received from the RFID tag; and
determining a moving direction of the RFID tag based on the plurality of signals and time information, wherein said step of determining the moving direction comprises:
calculating a linear approximate straight line; and
determining the moving direction based on an inclination of the linear approximate straight line.

15. The method according to claim 14, further comprising scanning a plurality of locations of an area including a path of the RFID tag in response to control signals, wherein the control signals are based on a plurality of scan angles.

* * * * *